US012578631B2

(12) United States Patent
Choi et al.

(10) Patent No.: US 12,578,631 B2
(45) Date of Patent: Mar. 17, 2026

(54) MOVABLE PROJECTOR

(71) Applicant: SAMSUNG ELECTRONICS CO., LTD., Suwon-si (KR)

(72) Inventors: Hyunyong Choi, Suwon-si (KR); Dongri Kim, Suwon-si (KR); Jisu Kim, Suwon-si (KR); Dosung Jung, Suwon-si (KR); Byungwook Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/318,761

(22) Filed: Sep. 4, 2025

(65) Prior Publication Data

US 2026/0063977 A1       Mar. 5, 2026

Related U.S. Application Data

(63) Continuation of application No. PCT/KR2025/010466, filed on Jul. 16, 2025.

(30) Foreign Application Priority Data

Sep. 4, 2024     (KR) ........................ 10-2024-0120382

(51) Int. Cl.
 *G03B 21/14*          (2006.01)
 *G03B 21/20*          (2006.01)
(52) U.S. Cl.
 CPC ......... *G03B 21/142* (2013.01); *G03B 21/145* (2013.01); *G03B 21/2046* (2013.01)
(58) Field of Classification Search
 CPC .............................................. G03B 21/00–64
 See application file for complete search history.

(56) References Cited

U.S. PATENT DOCUMENTS

| | | | |
|---|---|---|---|
| 7,086,745 B2 | 8/2006 | Watanabe et al. | |
| 2005/0083585 A1 | 4/2005 | Lin et al. | |
| 2015/0331302 A1* | 11/2015 | Watanuki ............. | G03B 21/147 |
| | | | 345/647 |
| 2020/0408386 A1* | 12/2020 | Heimbrock ............ | A61G 7/012 |

(Continued)

FOREIGN PATENT DOCUMENTS

| | | |
|---|---|---|
| CN | 106802534 A | 6/2017 |
| JP | 4168899 | 10/2008 |

(Continued)

OTHER PUBLICATIONS

International Search Report (ISR) and Written Opinion issued by the ISA for International Application No. PCT/KR2025/010466.

*Primary Examiner* — Christopher A Lamb, II
(74) *Attorney, Agent, or Firm* — STAAS & HALSEY LLP

(57) ABSTRACT

A movable projector may include: a main body; at least one wheel that moves the main body; a light source unit that moves with the main body, and that emits light; a plurality of lens units that have different directions for projecting the light; a driving unit that adjusts positions of the plurality of lens units; and a processor configured to, when the main body is moved by the at least one wheel so that the projection surface changes, control the driving unit to adjust a position of a lens unit of the plurality of lens units having a projection direction corresponding to the changed projection surface to a transmission position on a progression path of the light.

15 Claims, 26 Drawing Sheets

(56)          References Cited

U.S. PATENT DOCUMENTS

| | | |
|---|---|---|
| 2024/0045315 A1 | 2/2024 | Kim et al. |
| 2025/0068046 A1* | 2/2025 | Eum ...................... G03B 17/54 |

FOREIGN PATENT DOCUMENTS

| | | |
|---|---|---|
| JP | 6646964 | 2/2020 |
| KR | 10-0219647 | 9/1999 |
| KR | 20-0359642 | 8/2004 |
| KR | 10-1305314 | 9/2013 |
| KR | 10-1488082 | 2/2015 |
| KR | 10-2015-0136822 | 12/2015 |
| KR | 10-2497582 | 2/2023 |
| KR | 10-2023-0157217 | 11/2023 |
| KR | 10-2023-0157218 | 11/2023 |
| KR | 10-2024-0018925 | 2/2024 |

* cited by examiner

| 2000~| MEMORY | ⟷ | PROCESSOR | ⟷ | LIGHT SOURCE UNIT |~200 |
| 3000~| SENSOR | ⟷ | | ⟷ | DRIVING UNIT |~400 |

MOVABLE PROJECTOR

CROSS-REFERENCE TO RELATED APPLICATIONS

This application s a continuation of International Application No. PCT/KR2025/010466 designating the United States, filed on Jul. 16, 2025, in the Korean Intellectual Property Receiving Office and claiming priority to Korean Patent Application No. 10-2024-0120382, filed on Sep. 4, 2024, in the Korean Intellectual Property Office, the disclosures of each of which are incorporated by reference herein in their entireties.

BACKGROUND

Field

The present disclosure relates to a movable projector.

Description of Related Art

A projector is a device that projects image information onto a projection surface and may be referred to as an image output device or an image display device.

The projector may receive image information from an electronic device such as a computer and project light onto the projection surface to implement an image.

The projector generally has a light source that generates light according to image information and a lens that transmits the light generated from the light source and projects the transmitted light to the outside.

With the advancement of technology, projectors have become smaller and lighter, and thus, portable projectors have become commercialized. Recently, robot technology has been fused to develop a movable projector that can move.

The projection surface may change as the projector moves. For example, there may be a change such as projecting onto a wall surface and then onto a floor surface. In this case, the image quality may deteriorate, which needs to be prevented.

SUMMARY

In accordance with an aspect of the disclosure, a movable projector may include: a main body; at least one wheel that moves the main body; a light source unit that moves with the main body, and that emits light; a plurality of lens units that have different directions for projecting the light; a driving unit that adjusts positions of the plurality of lens units; and a processor configured to, when the main body is moved by the at least one wheel so that the projection surface changes, control the driving unit to adjust a position of a lens unit of the plurality of lens units having a projection direction corresponding to the changed projection surface to a transmission position on a progression path of the light.

The plurality of lens units may include: a first lens unit that projects light upward relative to the light source unit; and a second lens unit that projects light downward relative to the light source unit.

The processor may be further configured to: control the driving unit to adjust a position of the first lens unit to the transmission position when the changed projection surface is a wall surface.

The processor may be configured to control the driving unit to adjust a position of the second lens unit to the transmission position when the changed projection surface is a floor surface.

The first lens unit and the second lens unit may be stacked vertically.

The driving unit may include: a base that supports the light source unit and the plurality of lens units, a fixed member that is on the base and that fixes one of the plurality of lens units in the transmission position, and a motor that is on a side of the base.

The base may include a base top to which the plurality of lens units are coupled, and that is movable up and down, and a base bottom to which the light source unit is coupled.

The base top may be installed so as to be able to move up and down.

The base top may further include: a plurality of seating parts respectively corresponding to the plurality of lens units and to which the plurality of lens units are respectively coupled, and Each seating part of the plurality of seating parts may include a hole through the base top in a thickness direction.

The driving unit may further include a balance member having the same shape as the fixed member.

The driving unit may include a guide member that is coupled to the base top to support the fixed member.

The movable projector may include a first gear that is coupled to the motor to transmit a driving force of the motor to the base top.

The guide member may be coupled to a side of the base top.

The guide member may include: a guide surface that moves the fixed member, and a second gear that is meshed with the first gear so that, with the driving force transmitted to the first gear, the second gear is moved by movement of the first gear and movement of the second gear thereby moves the base top.

The guide surface may include a first surface that extends from a side of the guide member, a second surface that protrudes from the first surface toward the light source unit and tapers upward, a third surface that extends from the second surface parallel to a surface of the base top, a fourth surface that tapers downward from the third surface away from the light source unit, and a fifth surface that extends from the fourth surface parallel to the surface of the base top.

The first gear may be a pinion gear and the second gear may be a rack gear.

The driving unit may include a guide rail for guiding a movement path of the base top.

The guide rail may be arranged between the base top and the base bottom.

The fixed member may include: a pin in contact with the guide surface, an elastic member that is coupled to a side of the pin so that, with an external force applied to the pin, the pin moves in a direction away from the guide surface, a cover that is coupled to an end of the elastic member, and The base top may include a fixed groove having a shape corresponding to the pin.

The fixed groove may include: a first fixed groove that is on a lower side of the base top, and a second fixed groove that is above the first fixed groove.

The first fixed groove may be coaxial with a connection point between the first surface and the second surface.

The second fixed groove may be coaxial with a connection point between the fourth surface and the fifth surface.

The pin may include: a cylindrical body part, and a protrusion that extends outward from a surface of the cylindrical body part.

The protrusion may have a T-shaped cross-section, and may include a locking plate that contacts, and is movable along, the guide surface, and a fixed plate orthogonal to the locking plate, and that has a shape corresponding to, and seatable in, the fixed groove.

BRIEF DESCRIPTION OF THE DRAWINGS

FIG. 9 is a block diagram illustrating a partial configuration of the movable projector according to an embodiment of the present disclosure.

DETAILED DESCRIPTION

Figure 1:
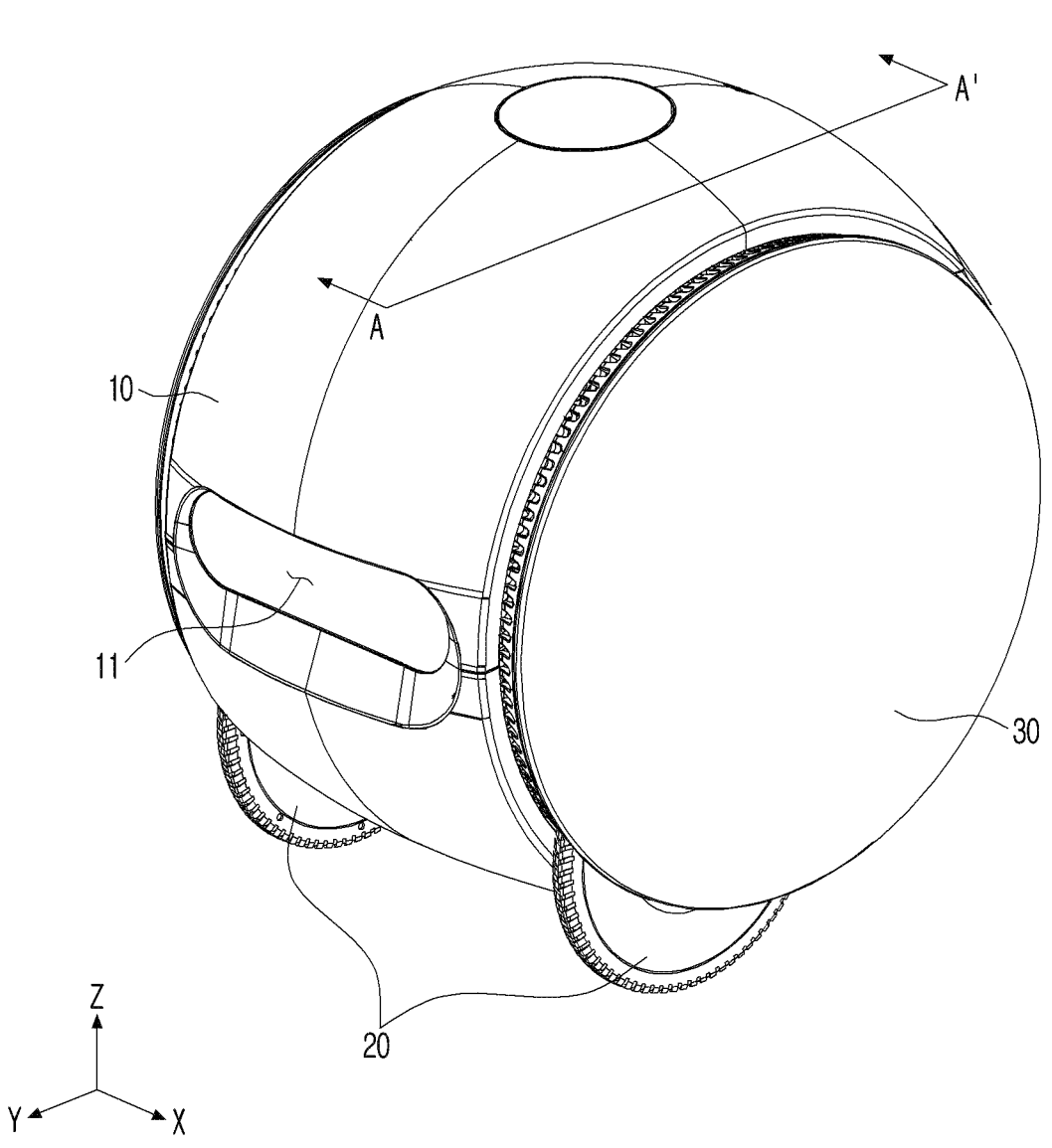
FIG. 1 is a perspective view of a movable projector according to an embodiment of the present disclosure.

Various embodiments of the present disclosure and terms used therein are not intended to limit the technical features described in the present disclosure to specific embodiments, and should be understood to include various changes, equivalents, or substitutes of the embodiments.

In connection with the description of the drawings, similar reference numerals may be used for similar or related components.

A singular form of a noun corresponding to an item may include one or more of the item, unless the context clearly dictates otherwise.

In the present disclosure, each phrase such as "A or B," "at least one of A and B," "at least one of A or B," "A, B, or C," "at least one of A, B and C," and "at least one of A, B, or C" may include any one of items listed together in the corresponding one of those phrases, or all possible combinations thereof.

The term "and/or" includes a combination of a plurality of related described components or any one of the plurality of related described components.

The terms "first", "second", or the like, may be used only to distinguish one component from the other components, and do not limit the corresponding components in other respects (e.g., importance or a sequence).

When any (e.g., first) component is referred to as "coupled" or "connected" to another (e.g., second) component with or without the term "functionally" or "communicatively", it means that any component may be connected to another component directly (e.g., in a wired manner), wirelessly, or through a third component.

It will be understood that terms 'include' or 'have' used in the present disclosure, specify the presence of features, numerals, steps, operations, components, parts mentioned in the present specification, or a combination thereof, but do not preclude the presence or addition of one or more other features, numerals, steps, operations, components, parts, or a combination thereof.

When a component is "connected," "coupled," "supported," or "contacted" with another component, this includes not only cases where the components are directly connected, coupled, supported, or contacted, but also cases where the components are indirectly connected, coupled, supported or contacted through a third component.

When a component is located "on" another component, this includes not only cases where a component is in contact with another component, but also cases where another component exists between the two components.

Hereinafter, a movable projector according to various embodiments will be described in detail with reference to the attached drawings.

Figure 2:
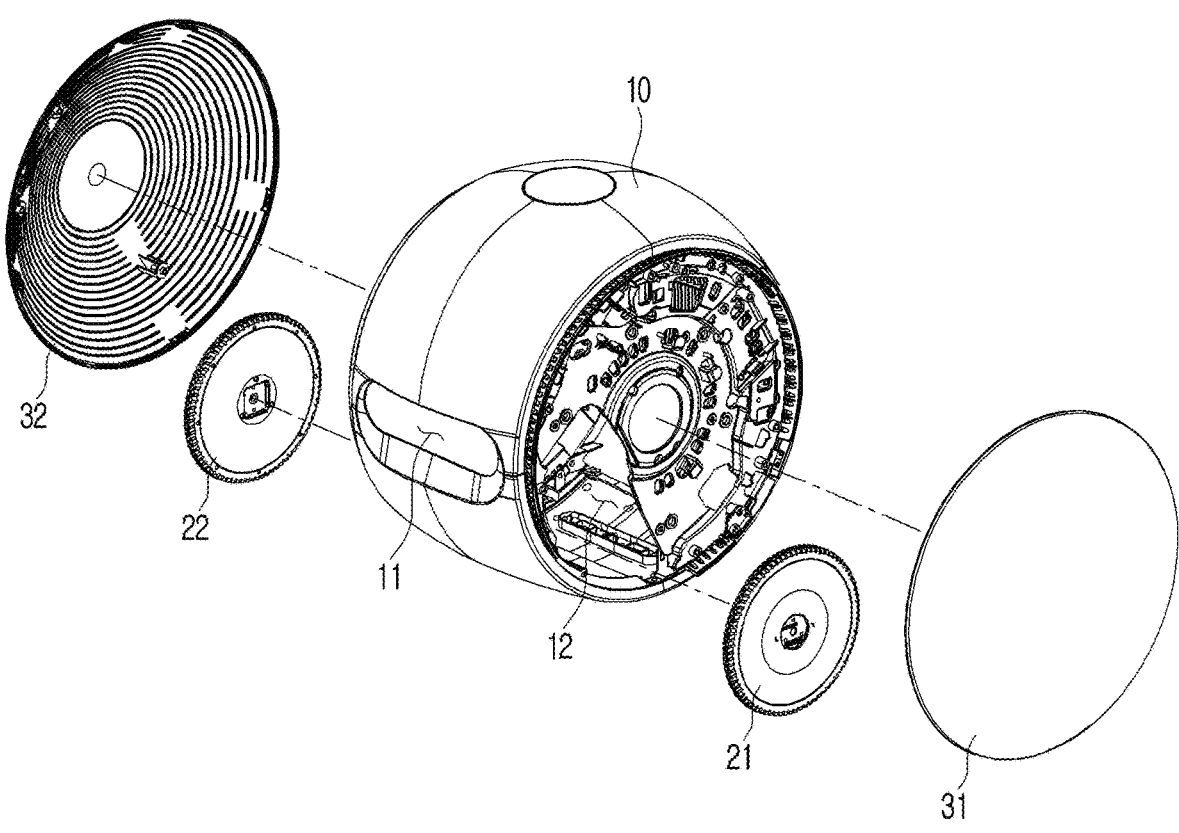
FIG. 2 is an exploded view illustrating a state in which a plurality of wheels of the movable projector according to an embodiment of the present disclosure are separated from a main body.

FIG. 1 is a perspective view of a movable projector according to an embodiment of the present disclosure. FIG. 2 is an exploded view illustrating a state in which a plurality of wheels of the movable projector according to an embodiment of the present disclosure are separated from a main body.

Referring to FIGS. 1 and 2, a movable projector 1 may include a main body 10 and a plurality of wheels 20.

The movable projector 1 is an image output device that can move on its own. The conventional projector is implemented in a form in which a user mounts the projector in a specific location and projects images on a fixed projection surface, but the movable projector 1 of the present disclosure includes a moving unit (not illustrated) including a plurality of wheels 20, so the movable projector 1 may move to various locations in a space such as a home or office and project images.

In the present disclosure, the projection surface may be a surface on which an image projected from the movable projector 1 is formed. When a dedicated projector screen is provided in a home or office, the screen may be used as the projection surface, but various external objects such as a wall surface, a ceiling, a floor surface, or one side surface of an object may also be used as the projection surface. The projection surface may change in various ways as the movable projector 1 moves.

Hereinafter, the projector 1 means the same device as the movable projector 1.

The main body 10 is a configuration for forming the exterior of the projector 1. In FIG. 1, the main body 10 is illustrated as being implemented in a roughly hollow cylindrical shape, but the shape of the main body 10 may change in various ways. For example, the main body 10 may be implemented in a flat shape that adheres to the floor surface, or implemented in a stand shape that is formed to be elongated in a vertical direction.

One side surface of the main body 10 may be formed to be openable. The main body 10 may include an image output module 100 (see FIG. 3) inside.

The image output module 100 may be installed in the main body 10 so as to output an image in an upward or downward inclined direction with respect to a horizontal plane.

The image output module 100 may be formed so as to project an image onto a screen erected on the ground, the wall surface, or the ground.

The image output module 100 will be described in detail in FIG. 3 and below.

The main body 10 may include a projection hole 11 so that an image output from the image output module 100 may be projected onto an outer side of the main body 10. The projection hole 11 may be formed toward a front (+Y direction) of the main body 10. The projection hole 11 may be formed on the same axis as the horizontal plane.

The plurality of wheels 20 are configured to move the main body 10. The plurality of wheels 20 may be installed on each of the left and right sides of the main body 10. The plurality of wheels 20 may include a left wheel 21 installed on the left side of the main body 10 and a right wheel 22 installed on the right side of the main body 10. The left wheel 21 and the right wheel 22 may be installed symmetrically. Alternatively, the left wheel 21 and the right wheel 22 may be formed identically.

The left wheel 21 and the right wheel 22 may be installed rotatably on the main body 10. Specifically, although not illustrated in the drawings, the left wheel 21 and the right wheel 22 may be coupled to a moving motor by a wheel-shaft.

The left wheel 21 and the right wheel 22 may be covered by a wheel cover 30. In other words, the wheel cover 30 may be installed on an outer side of an opposite side of a side where the left wheel 21 and the right wheel 22 are coupled to the main body 10. The wheel cover 30 may include a left wheel cover 31 and a right wheel cover 32. The wheel cover 30 may be formed to have a shape corresponding to one side surface of the main body 10. In other words, an outer circumferential surface of the main body 10 and the wheel cover 30 may be a part of an outer circumferential surface of a sphere having the same center point and the same diameter.

Meanwhile, a first angle adjustment hole 12 may be formed on the side surface of the main body 10 where the left wheel 21 and the right wheel 22 are installed.

The main body 10 may rotate in a pitch direction so that the position of the projection hole 11 changes depending on a direction in which the image is to be projected. In this case, when an area where the wheel-shaft connecting the left wheel 21 and the right wheel 22 and the main body 10 penetrates through the main body 10 is limited to an area corresponding to the cross-sectional area of the wheel-shaft, a rotation radius of the main body 10 may be limited.

The first angle adjustment hole 12 may be formed in an area corresponding to the preset rotation radius of the main body 10. That is, the first angle adjustment hole 12 may be formed so that the wheel-shaft does not collide with the main body 10 when the main body 10 rotates by the preset radius.

In addition, although FIG. 1 illustrates a case where two wheels 20 are arranged on both sides of the main body 10, the number, size, shape, etc., of the wheels 20 may also change in various ways. For example, FIG. 1 illustrates a case where the wheel 20 is built into the main body 10 so that an area of the side surface of the wheel 20 is not exposed, but when the wheel 20 is implemented in a form attached to both sides of the main body 10, the side surface of the wheel 20 may be completely exposed.

Figure 5:
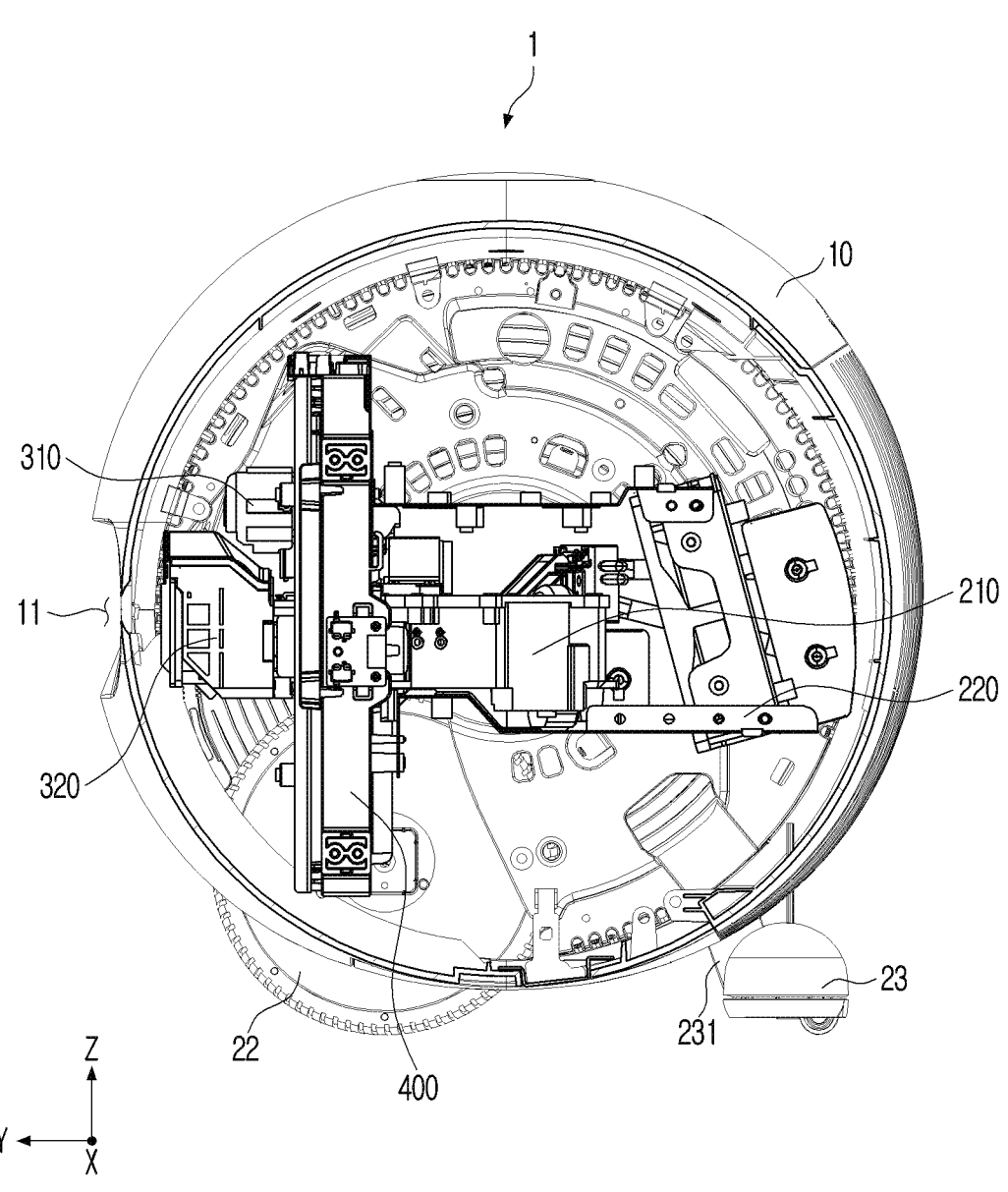
FIG. 5 is a schematic view illustrating a cross-section along line A-A' of FIG. 1.

The plurality of wheels 20 may include at least one auxiliary wheel 23 (see FIG. 5). The auxiliary wheel 20 is configured to support a load of the main body 10. The auxiliary wheel 23 may be installed at a rear (−Y direction) of the main body 10.

The auxiliary wheel 23 may be connected to the main body 10 by an auxiliary wheel arm 231.

The auxiliary wheel arm 231 may be formed to penetrate through the main body 10. That is, a second angle adjustment hole (not illustrated) through which an auxiliary wheel arm 231 penetrates may be formed in the main body 10.

The main body 10 may rotate in the pitch direction so that the position of the projection hole 11 changes depending on the direction in which the image is to be projected. The second angle adjustment hole may be formed with a length corresponding to the rotation radius of the main body 10.

Since the auxiliary wheel arm 231 is arranged to penetrate through the main body 10 through the second angle adjustment hole, even if the main body 10 rotates, the auxiliary wheel arm 231 and the main body 10 do not collide with each other, so the main body 10 may freely rotate.

The projector 1 includes the main body 10 on which the plurality of wheels 20 are installed, so that the projector 1 is not fixed to a position initially mounted by a user, but moves to an input projection position and outputs an image at a specific angle on a specific projection surface.

The plurality of wheels 20 may rotate by driving the motor to move the main body 10. When the wheels 20 are arranged on both sides of the main body 10, the rotation speeds of the wheels on both sides may change to change a progress path of the main body 10.

Figure 3:
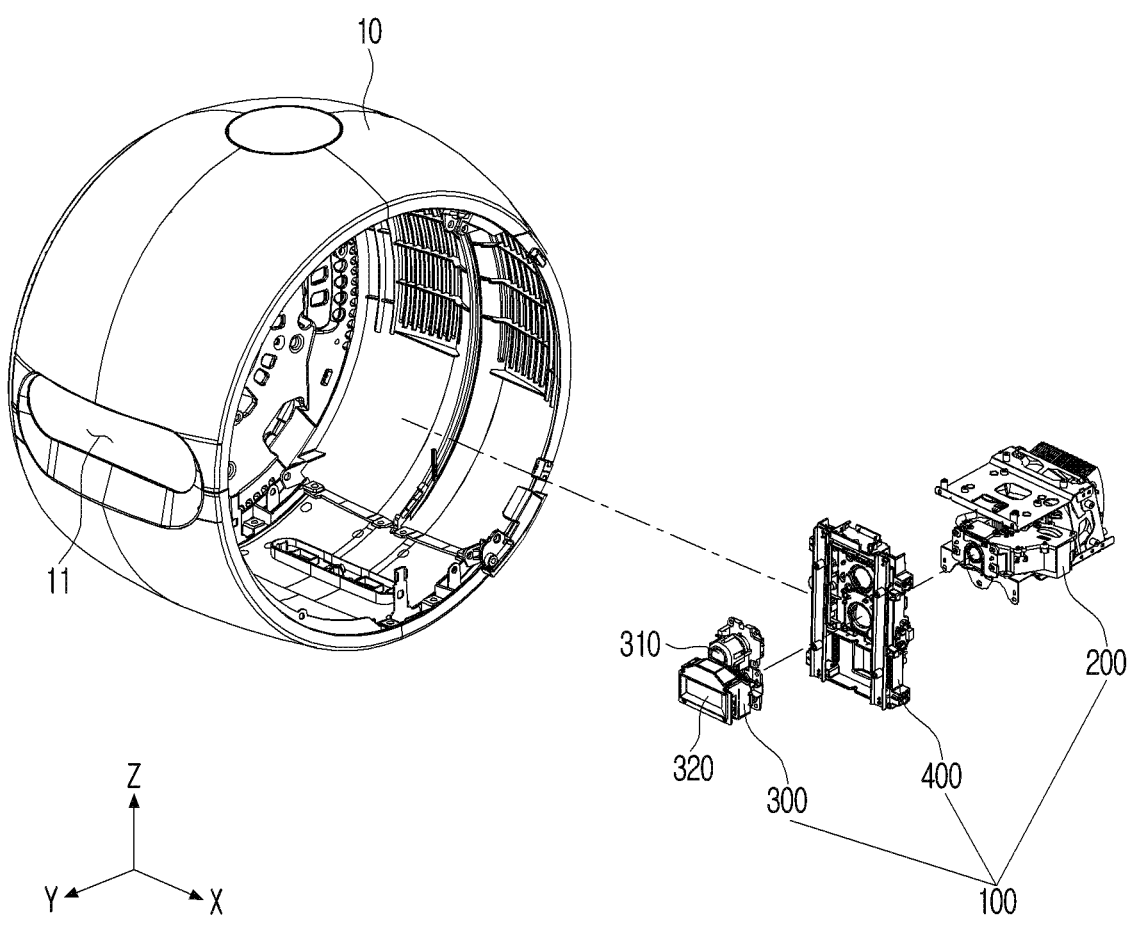
FIG. 3 is an exploded view of a main body of the movable projector according to an embodiment of the present disclosure.
Figure 4:
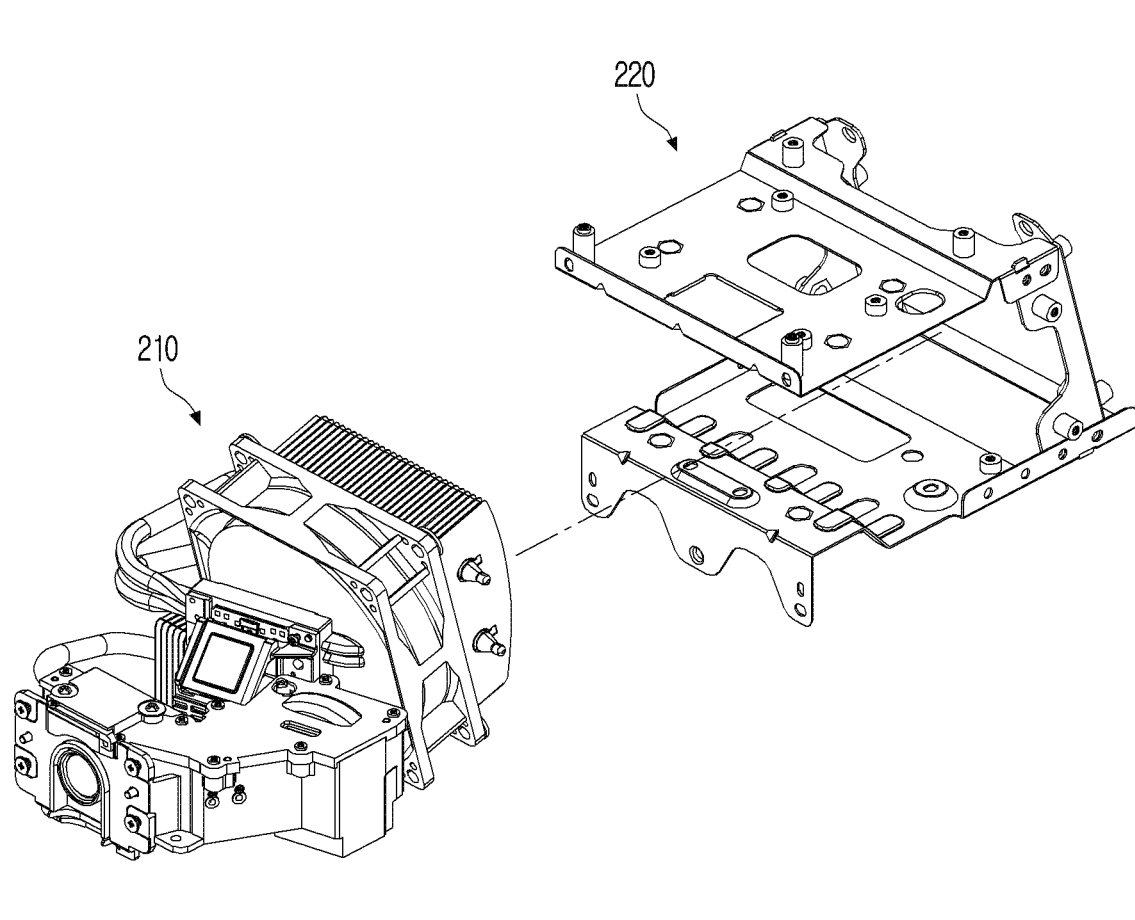
FIG. 4 is an exploded view of a light source unit of the movable projector according to an embodiment of the present disclosure.
Figure 4:
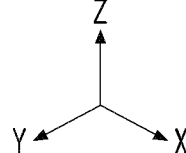

FIG. 3 is an exploded view of a main body of the movable projector according to an embodiment of the present disclosure. FIG. 4 is an exploded view of a light source unit of the movable projector according to an embodiment of the present disclosure.

Referring to FIG. 3, the image output module 100 may be installed inside the main body 10. The image output module 100 may be coupled to an inner surface of the main body 10.

The image output module 100 may include a light source unit 200, a lens unit 300, and a driving unit 400.

The image output module 100 may receive image data from an external device and output light corresponding to the received image data. The image output module 100 may project light onto the projection surface through the projection hole 11 of the main body 10. The light output from the image output module 100 may be implemented as an image on the projection surface.

The image output module 100 may project light upward from the main body 10. Alternatively, the image output module 100 may project light downward from the main body 10.

The light source unit 200 is configured to emit light. Referring to FIG. 4, the light source unit 200 may include a lamp 210 and a lamp support member 220. The lamp 210 may receive power to output light. The lamp 210 may be implemented as an LED, a laser, etc., and the type of the light source is not necessarily limited to those described. For example, the lamp 210 may be implemented by combining the LED and the laser. The lamp 210 may be coupled to the lamp support member 220.

The lamp support member 220 is configured to fix the lamp 210 to the main body 10. The lamp support member 220 may be formed to be long in a Y-axis direction inside the main body 10. One side surface of the lamp support member 220 may be coupled to the driving unit 400.

Referring back to FIG. 3, the lens unit 300 is configured to expand a projection angle of light output from the light source unit 200. The lens unit 300 may include a plurality of lens units 310 and 320 that project light output from the light source unit 200 in different directions.

The lens unit 300 may include a first lens unit 310 that projects light upward based on the light source unit 200.

In addition, the lens unit 300 may include a second lens unit 320 that projects light downward based on the light source unit 200.

The first lens unit 310 and the second lens unit 320 may be arranged to be stacked vertically.

The first lens unit 310 and the second lens unit 320 may be coupled to a driving unit 400. A detailed description of the lens unit 300 will be described later.

The driving unit 400 is configured to allow the lens unit 300 to move. Specifically, the driving unit 400 is configured to allow the lens unit 300 to move up and down on a Z-axis.

In other words, the driving unit 400 is configured to adjust the positions of a plurality of lens units 310 and 320.

The driving unit 400 may be arranged to be coupled to the inner surface of the main body 10. Since the driving unit 400 is coupled to the main body 10, the load of the light source unit 200 and the lens unit 300 coupled to the driving unit 400 may be transmitted to the main body 10.

Figure 6:
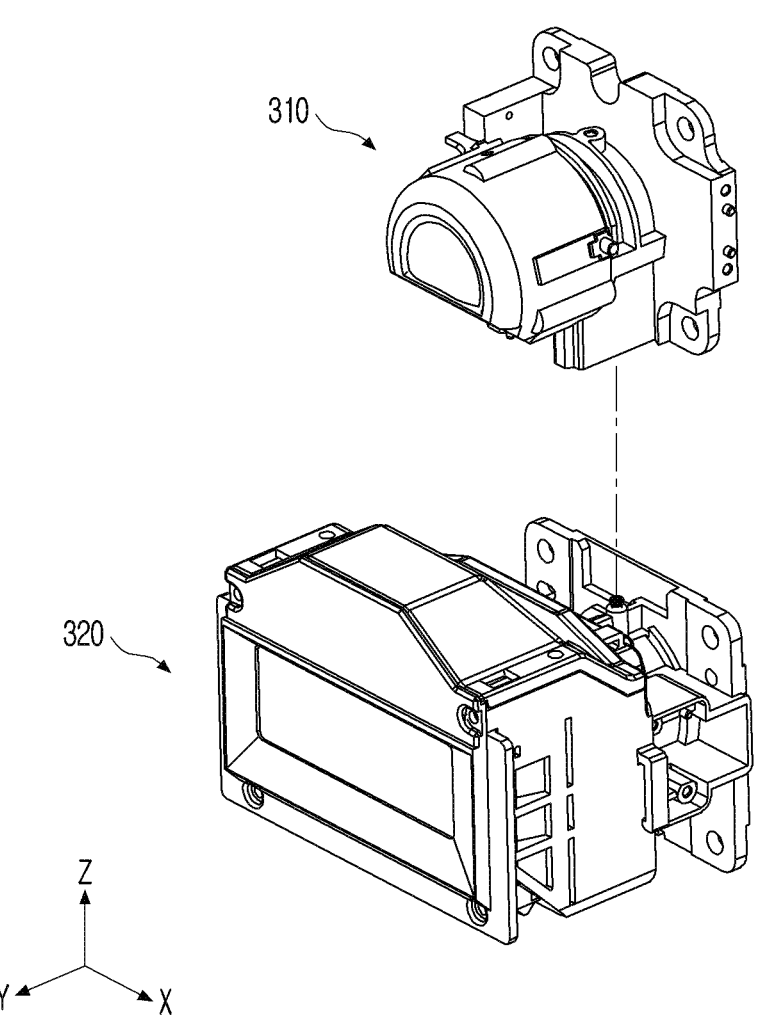
FIG. 6 is an exploded view of a lens unit of the movable projector according to an embodiment of the present disclosure.

FIG. 5 is a schematic view illustrating a cross-section along line A-A' of FIG. 1. FIG. 6 is an exploded view of a lens unit of the movable projector according to an embodiment of the present disclosure.

FIG. 5 illustrates the positions where the light source unit 200, the lens unit 300, and the driving unit 400 are arranged inside the main body 10.

Referring to FIG. 5, the light source unit 200 may be arranged at the rear inside the main body 10. The lens unit 300 may be arranged at a position corresponding to the projection hole 11 in the front of the main body 10. The driving unit 400 may be arranged between the light source unit 200 and the lens unit 300.

The light source unit 200 may be arranged to be parallel to the ground. That is, the lamp support member 220 of the light source unit 200 may be arranged to be parallel to a Y-axis. Accordingly, the light output from the lamp 210 may be output parallel to the Y-axis.

The lens unit 300 may be controlled so that at least one of the plurality of lens units 310 and 320 is positioned on the same axis as the light source unit 200. In other words, the position of at least one of the first lens unit 310 or the second lens unit 320 may be controlled so that the light output from the lamp 210 is projected onto the outside of the main body 10 through the projection hole 11.

In order for the lens unit 300 to project the light output from the light source unit 200, the lens unit 300 should be positioned at a transmission position on a progression path of light output from the lamp 210.

Here, the transmission position may be the position where the lens should be arranged within the path through which the light output from the lamp 210 progresses. In the process of the light transmitting through the lens, the image may be enlarged or reduced depending on the magnification of the lens, and the focus may also be adjusted. In addition, the direction in which light is refracted and projected to the outside may also change depending on the arrangement of the lens.

A detailed description of the position control of the lens unit 300 will be described later.

Referring to FIG. 6, the lens unit 300 may include the first lens unit 310 and the second lens unit 320. The first lens unit 310 and the second lens unit 320 may include different lenses so that the direction in which the light output from the light source unit 200 is projected is different.

For example, the first lens unit 310 may be provided with a lens for projecting light onto the projection surface that is further away than the second lens unit 320.

In other words, the first lens unit 310 may be referred to as a long-distance projection lens, and the second lens unit 320 may be referred to as a short-distance projection lens.

The first lens unit 310 and the second lens unit 320 may be arranged to be stacked vertically. Specifically, the first lens unit 310 and the second lens unit 320 may be coupled to the driving unit 400 to be stacked vertically in the Z-axis direction.

As the driving unit 400 operates, light may be projected onto one of the first lens unit 310 or the second lens unit 320.

Figure 7:
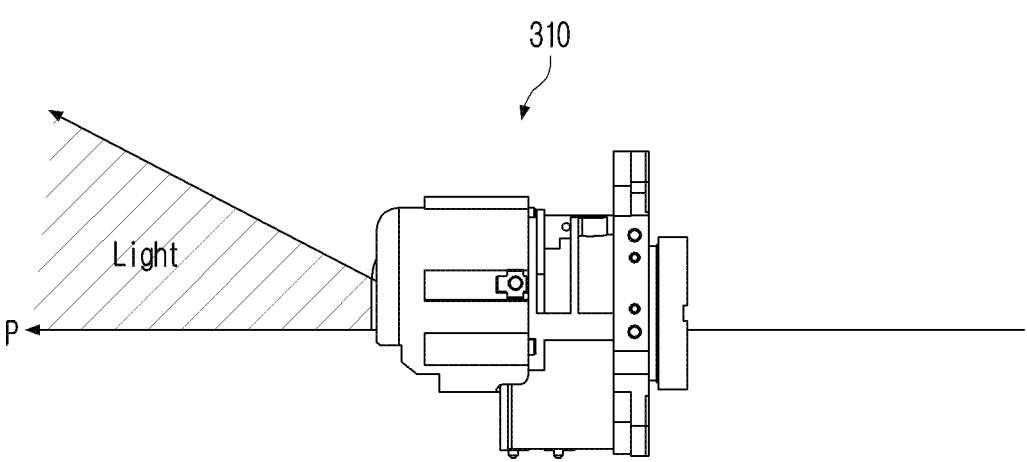
FIGS. 7 and 8 are diagrams for describing projection angles of light of each of a plurality of lens units of the movable projector according to an embodiment of the present disclosure.
Figure 8:
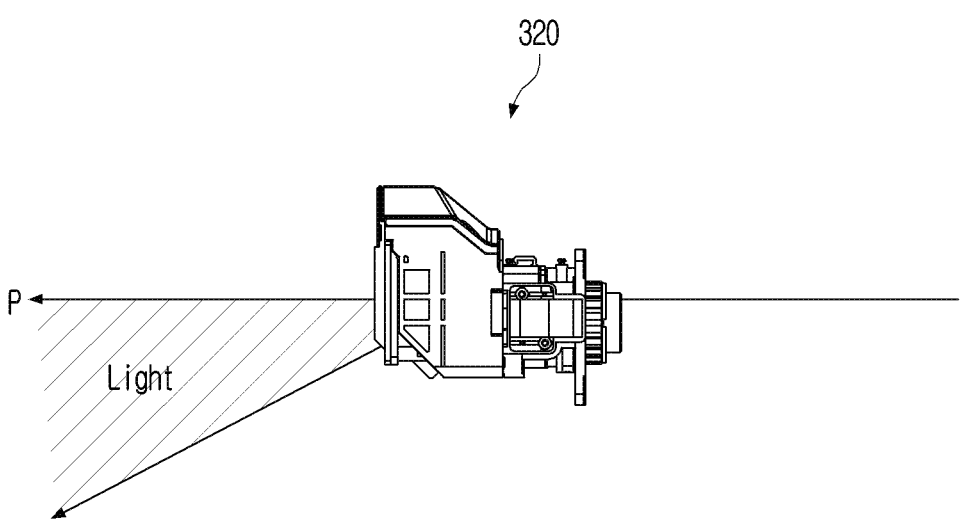

FIGS. 7 and 8 are diagrams for describing projection angles of light of each of a plurality of lens units of the movable projector according to an embodiment of the present disclosure.

Referring to FIGS. 7 and 8, the first lens unit 310 and the second lens unit 320 may project light output from the lamp 210 in different directions.

Each of the first lens unit 310 and the second lens unit 320 may be implemented as a lens assembly having at least one lens coupled therein. The direction of light projected outward from the first lens unit 310 and the second lens unit 320 may vary depending on the arrangement position or angle of the lenses inside the first lens unit 310 and the second lens unit 320.

Specifically, the first lens unit 310 may project the light output from the lamp 210 upward. The second lens unit 320 may project the light output from the lamp 210 downward. Here, the upward and downward are determined based on an imaginary axis P that passes through the lamp 210 of the light source unit 200 and is parallel to the ground. Specifically, the direction toward the ground based on the axis P may be downward, and the direction opposite to the ground based on the axis P may be upward.

The first lens unit 310 may be configured to project the light output from the lamp 210 onto the wall surface. The second lens unit 320 may be configured to project the light output from the lamp 210 onto the floor surface.

In other words, when the first lens unit 310 is at the transmission position on the progression path of the light output from the lamp 210, the projector 1 may project an image onto the projection surface located in front of the projector 1.

In contrast, when the second lens unit 320 is located at the transmission position on the progression path of the light output from the lamp 210, the projector 1 may project an image onto the floor surface in front of the projector 1.

In this way, the projector 1 according to the present disclosure may project an image on different projection surfaces as needed by allowing the light output from the same light source (e.g., the lamp 210) to be projected in various directions.

In other words, even if the user does not directly adjust a height of the projector 1, the position of the projector 1 is fixed, and only the positions of the plurality of lens units 300 may change to project an image onto different projection surfaces.

In this way, the selection of the projection surface may be convenient when projecting an image using the projector 1.

Figure 9:
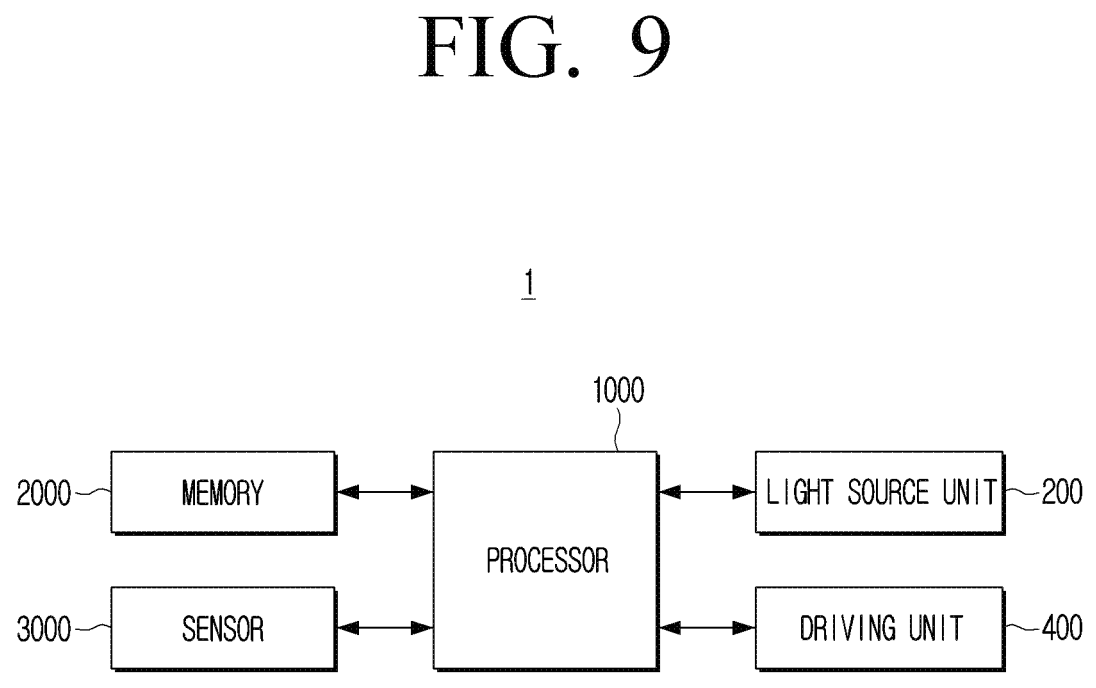

FIG. 9 is a block diagram illustrating a partial configuration of the movable projector according to an embodiment of the present disclosure.

Referring to FIG. 9, the projector 1 may further include a processor 1000, a memory 2000, and a sensor 3000.

The processor 1000 is configured to control the overall operation of the projector 1. Specifically, the processor 1000 may control the driving unit 400 to adjust the positions of the plurality of lens units 300. In addition, the processor 1000 may control the light output from the light source unit 200 based on image data injected from an external device.

The processor 1000 may include one or plurality of processors 1000. In this case, one or more processors 1000 may include at least one of a central processing unit (CPU), a graphics processing unit (GPU), and a neural processing unit (NPU), but are not limited to the examples of the processors 1000 described above.

The CPU is a general-purpose processor that may perform not only general operations but also artificial intelligence operations, and may efficiently execute complex programs through a multi-layer cache structure. The CPU is advantageous for a serial processing method, which allows organic connection between previous and next operation results through sequential operations. The general-purpose processor is not limited to the above-described examples, except where specified as the above-described CPU.

The GPU is a processor for large-scale operations such as floating-point operations used in graphics processing, and may perform the large-scale operations in parallel by integrating a large number of cores. In particular, the GPU may be more advantageous than the CPU in a parallel processing method such as a convolution operation. In addition, the GPU may be used as a co-processor to supplement the functions of the CPU. The processor for the large-scale operation is not limited to the above-described example, except for the case specified as the above-described GPU.

The NPU is a processor specialized in the artificial intelligence operations using the artificial neural network, and each layer that constitutes the artificial neural network may be implemented in hardware (e.g., silicon). In this case, the NPU is specifically designed according to the company's requirements, so it has a lower degree of freedom than the CPU or GPU, but may efficiently process the artificial intelligence operations requested by the company. Meanwhile, as the processor specialized for the artificial intelligence operations, the NPU may be implemented in various forms such as a tensor processing unit (TPU), an intelligence processing unit (IPU), and a vision processing unit (VPU). The artificial intelligence processor is not limited to the examples described above, except where specified as the NPU described above.

In addition, one or more processors 1000 may be implemented as a System on Chip (SoC). In this case, in addition to one or more processors 1000, the SoC may further include a memory 2000 and a network interface such as a bus for data communication between the processor 1000 and the memory 2000.

When the SoC included in the projector 1 includes the plurality of processors 1000, the projector 1 may use some of the plurality of processors 1000 to perform the artificial intelligence-related operations (e.g., artificial intelligence operations related to model learning or inference). For example, the projector 1 may perform the artificial intelligence-related operations using at least one of the GPU, NPU, VPU, TPU, or hardware accelerator specialized for the artificial intelligence operations, such as the convolution operation and the matrix multiplication operation, among the plurality of processors 1000. However, this is only an example, and it goes without saying that the artificial intelligence-related operations may be processed using the general-purpose processors 1000 such as the CPU.

The processor 1000 may change the position of the projector 1 by controlling the plurality of wheels 20. For example, when a user operates a remote control or inputs a voice command or motion command to command the change of the position of the projector 1, the processor 1000 drives the plurality of wheels 20 based on the command.

Map information of the space where the projector 1 is located may be stored in the memory 2000. When the projector 1 is provided with at least one sensor such as a lidar sensor, a camera, an infrared sensor, or an ultrasonic sensor, the processor 1000 may directly generate the map information based on sensing data acquired by each sensor while sequentially driving in a space. Alternatively, when the projector 1 includes a communication module, the processor 1000 may receive the map information from an external device such as a robot cleaner or a user's mobile phone through the communication module and store the map information in the memory 2000.

The processor 1000 controls the plurality of wheels 20 and other components to project an image onto an appropriate projection surface within a space based on the map information. Accordingly, the projection surface may change.

In this way, the processor 1000 may control the positions of the plurality of lens units 300 according to the position of the projection surface onto which the image is projected.

When the main body 10 moves and the projection surface onto which light is projected changes, the processor 1000 may control the driving unit 400 to adjust the position of the lens unit (e.g., one of the first lens unit 310 or the second lens unit 320) among the plurality of lens units 300 having the projection direction corresponding to the projection surface to the transmission position on the light path.

The position of the projection surface may be sensed by the sensor 3000. The sensor 3000 may be a camera sensor or a lidar sensor, but the type of the sensor 3000 is not necessarily limited thereto.

When the sensor 3000 is a camera sensor, the processor 1000 may analyze an image captured by the camera to determine whether an object included in the image is a wall surface.

There are various ways to analyze the image. For example, the processor 1000 may divide the captured image into pixel groups including multiple pixels. Each pixel group may partially overlap. The processor 1000 extracts characteristic values for each pixel group. The characteristic values may be detected according to various criteria such as an average pixel value, a maximum pixel value, or a minimum pixel value of pixels belonging to the corresponding pixel group. The processor 1000 detects the positions of pixel groups having the same or similar characteristic values among adjacent pixel groups. The processor 1000 connects the detected pixel groups to determine an edge of the object included in the captured image. The processor 1000 determines the type, size, shape, etc., of the object based on the positions and number of pixel groups included in the edge, the characteristic values of the pixel groups, etc.

The processor 1000 may identify whether an object in an image is a wall surface or a floor surface by comparing the data previously stored in the memory 2000 with the characteristic values of the pixel groups within the edge.

The case of identifying the projection surface using the camera has been described above, but it is not necessarily limited thereto, and the processor 1000 may also identify the projection surface based on the map information and pitch angle, roll angle, and yaw angle information of the projector 1.

For example, when the position of the movable projector 1 within a map is adjacent to the wall surface, the processor 1000 may identify the yaw angle of the projector 1 to determine whether the movable projector 1 is facing the wall surface. When the pitch angle of the projector 1 is within a normal range and is facing the wall surface, the processor 1000 may determine that the projection surface is the wall surface. On the other hand, when the processor 1000 identifies that the projector 1 is spaced apart from the wall surface by a certain distance or more and the pitch angle range is an angle range in which the main body of the projector 1 is tilted toward the floor surface, the processor 1000 may determine that the projection surface is the floor surface.

When the memory 2000 stores an AI model trained for the determination of the projection surface, or when the communication module capable of performing communication with an external server device in which such an AI model is stored is provided, the processor 1000 may also determine the projection surface based on the output value of the AI model.

When the projection surface is the wall surface, the processor 1000 may control the driving unit 400 to adjust the position of the first lens unit 310 to the position where the light output from the lamp 210 is transmitted.

When the floor surface located in front of the projector 1 is sensed by the sensor 3000, the processor 1000 may determine that the projection surface is the floor surface. When the projection surface is the floor surface, the processor 1000 may control the driving unit 400 to adjust the position of the second lens unit 320 to the position where the light output from the lamp 210 is transmitted.

The memory 2000 may store at least one instruction regarding the projector 1. In addition, the memory 2000 may store an operating system (O/S), data, etc., for driving the projector 1.

The memory 2000 may include a semiconductor memory such as a flash memory, a magnetic storage medium such as a hard disk, etc. For example, various software modules for operating the projector 1 according to various embodiments of the disclosure may be stored in the memory 2000, and the processor 1000 may run the various software modules stored in the memory 2000 to control an operation of the projector 1.

That is, the memory 2000 may be accessed by the processor 1000, and readout, recording, correction, deletion, update, and the like, of data in the memory 120 may be performed by the processor 1000.

The memory 2000 may be provided as a separate configuration from the processor 1000, may be implemented in the form of a ROM or RAM arranged in the processor 1000, may be implemented in various external storage media (e.g., micro SD card, memory stick) mounted on the projector 1, etc. In the present disclosure, the memory 2000 may be used to mean all of these forms.

The memory 2000 may include information on the control of the driving unit 400 for moving the plurality of lens units 300. For example, the memory 2000 may include information on the positions of the plurality of lens units 300 corresponding to the positions of the projection surface. For example, when the projection surface is the projection surface that is vertically erected in front of the projector 1, such as the wall surface, data for controlling the driving unit 400 so that the first lens unit 310 is positioned on the light transmission path, when the projection surface is a horizontal surface close to the ground in front of the projector 1, such as the floor surface, data for controlling the driving unit 400 so that the second lens unit 320 is positioned on the light transmission path, etc., may be included.

The data on the positions of a plurality of lens units 300 corresponding to the positions of the projection surface may be set in advance by a manufacturer during the process of manufacturing the projector 1 and stored in the memory 2000.

Here, the information or data may have the same meaning as an instruction. The processor 1000 may control the overall operation of the projector 1 by executing at least one instruction stored in the memory 2000 as described above.

In addition, the memory 2000 may store the map information or the AI model described above.

Figure 10:
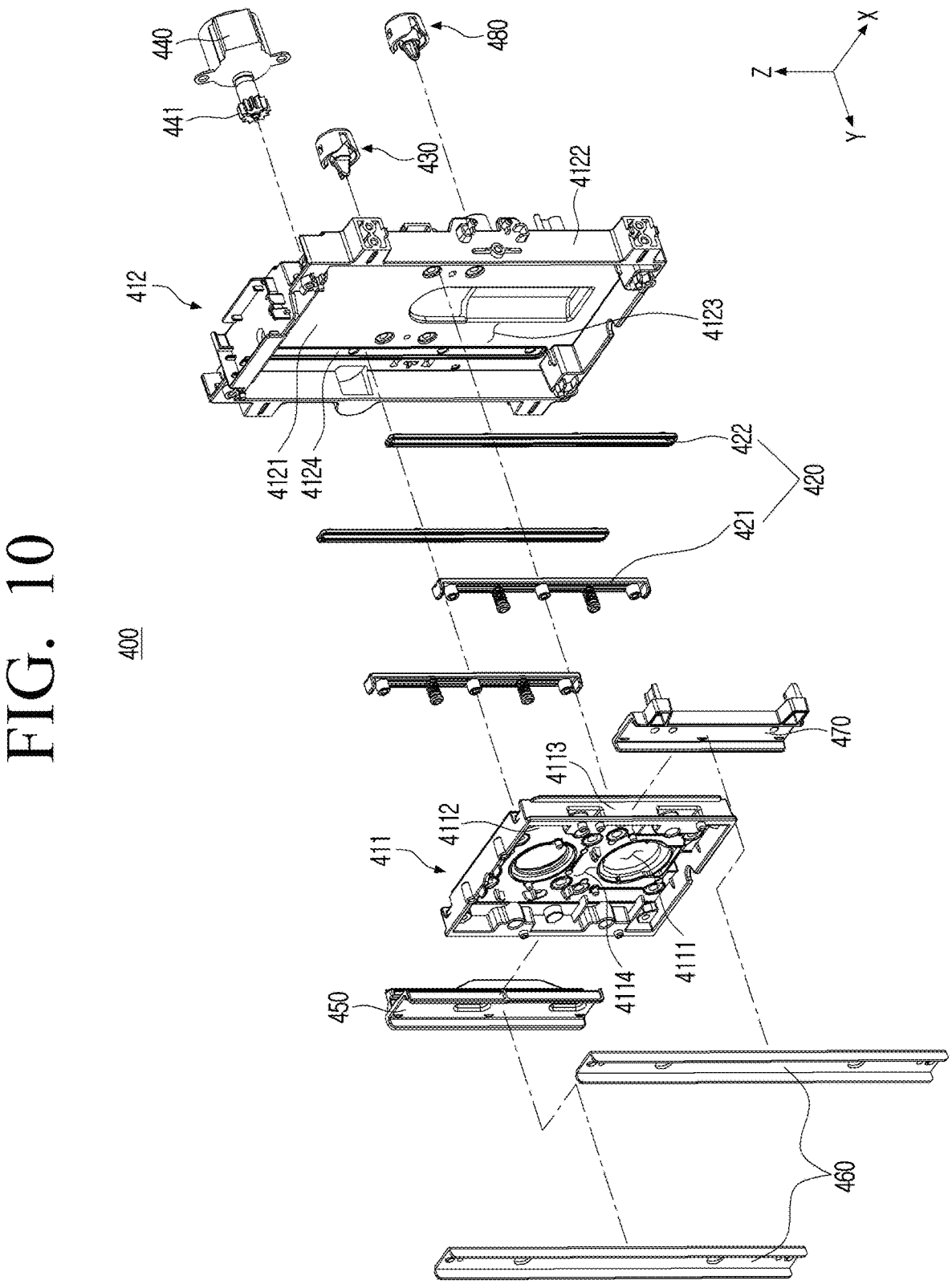
FIG. 10 is an exploded view of a driving unit of the movable projector according to an embodiment of the present disclosure.

FIG. 10 is an exploded view of a driving unit of the movable projector according to an embodiment of the present disclosure.

Referring to FIG. 10, the driving unit 400 may include a base 410, a fixed member 430, and a motor 440.

The base 410 is configured to support the light source unit 200 and the plurality of lens units 300. The light source unit 200 and the plurality of lens units 300 may be coupled to the base 410.

The base 410 may include a base top 411 and a base bottom 412. The base top 411 is configured to be coupled to the plurality of lens units 300. The base bottom 412 is configured to be coupled to the light source unit 200. The base top 411 may be installed to be able to move up and down on the base bottom 412.

The base top 411 may include a seating part 4111. The seating part 4111 is configured to be coupled to the plurality of lens units 300. The seating part 4111 may be formed to have a shape corresponding to one surface of each of the first lens unit 310 and the second lens unit 320 so that the plurality of lens units 300 may be mounted.

The seating part 4111 may be formed in a hole shape penetrating through the base top 411 in the thickness direction. The seating part 4111 may be provided in a number corresponding to the number of lens units 300.

The base top 411 may be formed in an approximately rectangular shape. The base top 411 may be installed on an inner side of the base bottom 412.

The base top 411 may include a base top plate 4112 formed as a rectangular flat plate and a base top wall surface 4113 extending vertically from an edge of the base top plate 4112.

The seating parts 4111 may be formed on the base top plate 4112 in the number corresponding to the number of lens units 300.

A lens accommodating part 4114 may be formed on one side of the base top plate 4112 by the base top wall surface 4113. The lens accommodating part 4114 may be formed in an approximately rectangular parallelepiped shape.

The base bottom 412 may include a base bottom plate 4121 and a base bottom wall surface 4122. The base bottom plate 4121 may be formed as an approximately rectangular flat plate. The base bottom wall surface 4122 may be configured to extend vertically from an edge of the base bottom plate 4121.

A base top accommodating part 4123 capable of accommodating the base top may be formed on one side of the base bottom plate 4121 by the base bottom wall surface 4122. The base top accommodating part 4123 may be formed in an approximately rectangular parallelepiped shape.

The base top plate 4112 may be formed to have a smaller width than the base bottom plate 4121.

A protruding length of the base top wall surface 4113 may correspond to that of the base bottom wall surface 4122.

Meanwhile, the driving unit 400 may further include a guide rail 420.

The guide rail 420 is configured to guide a movement path of the base top 411. Specifically, the guide rail 420 is configured to guide the path along which the base top 411 moves up and down in the base top accommodating part 4123.

The guide rail 420 may be arranged between the base top 411 and the base bottom 412.

The guide rail 420 may include a guide rail top 421 and a guide rail bottom 422.

The guide rail top 421 is configured to be coupled to the base top 411. The guide rail top 421 may include a plurality of holes 4211.

The plurality of holes 4211 are configured to be fastened with a coupling member (not illustrated). The plurality of holes 4211 may be formed by protruding and extending from one surface of the guide rail top 421. The coupling member may have a configuration having a length longer than the protruding length of the plurality of holes 4211.

The guide rail top 421 may be stably fixed to the base top 411 by the coupling member (not illustrated) penetrating through the plurality of holes 4211.

In the drawing, the plurality of holes 4211 are illustrated as being formed in three locations on one side of the guide rail top 421, but the shape and number of the plurality of holes 4211 are not necessarily limited to those illustrated.

The guide rail 420 may be provided in two or more pieces. However, it is not necessarily limited to the number illustrated in the drawing, and the number of guide rails 420 may be increased or decreased according to an embodiment, if necessary.

The guide rail bottom 422 is configured to be coupled to the base bottom 412. The guide rail bottom 422 may accommodate the guide rail top 421. That is, the guide rail top 421 may be accommodated in the guide rail bottom 422 and move up and down.

The guide rail bottom 422 may be formed in a number corresponding to the guide rail top 421. In addition, the guide rail bottom 422 may be provided at a position corresponding to the guide rail top 421.

The guide rail top 421 may be formed in a length corresponding to the height of the base top 411, and the guide rail bottom 422 may be formed in a length corresponding to the height of the base bottom 412. Here, the height may mean the length in the Z-axis direction of the work configuration.

A guide rail coupling groove 4124 may be formed on the base bottom plate 4121. The guide rail coupling groove 4124 may have a shape corresponding to one surface of the guide rail bottom 422 and may be formed by being depressed into one surface of the base bottom plate 4121 so that the guide rail bottom 422 is seated.

Specifically, the guide rail coupling groove 4124 may be formed on one surface of the base bottom plate 4121 that comes into contact with the base top accommodating part 4123.

The guide rail coupling grooves 4124 may be provided in a number corresponding to the number of guide rail bottoms 422.

The guide rail top 421 coupled to the base top 411 is accommodated in the guide rail bottom 422 coupled to the base bottom 412, so the base top 411 can move up and down inside the base bottom 412.

The fixed member 430 is configured to fix one of the plurality of lens units 300 to the light transmission position. The fixed member 430 may be provided on one side of the base bottom 412. The fixed member 430 may be coupled at the rear of the base bottom 412. A detailed description of the fixed member 430 and the balance member 480 will be described later.

The motor 440 is configured to change the positions of the plurality of lens units 300 by being received with power to generate the driving force. The motor 440 may be provided on one side of the base 410.

Specifically, the motor 440 may be installed on the rear of the base bottom 412. The motor 440 may be a BLDC motor and may include a stator and a rotor. However, the type of the motor 440 is not necessarily limited thereto, and various types of motors may be utilized according to an embodiment.

The driving unit 400 may include a first gear 441 coupled to the motor 440 to transmit the driving force of the motor 440 to the base top 411.

The first gear 441 may be a pinion gear, but is not necessarily limited thereto. The first gear 441 may be coupled to one side of the motor 440. Again, the first gear 441 may be installed to mesh with a guide member 450 described below.

Figure 11:
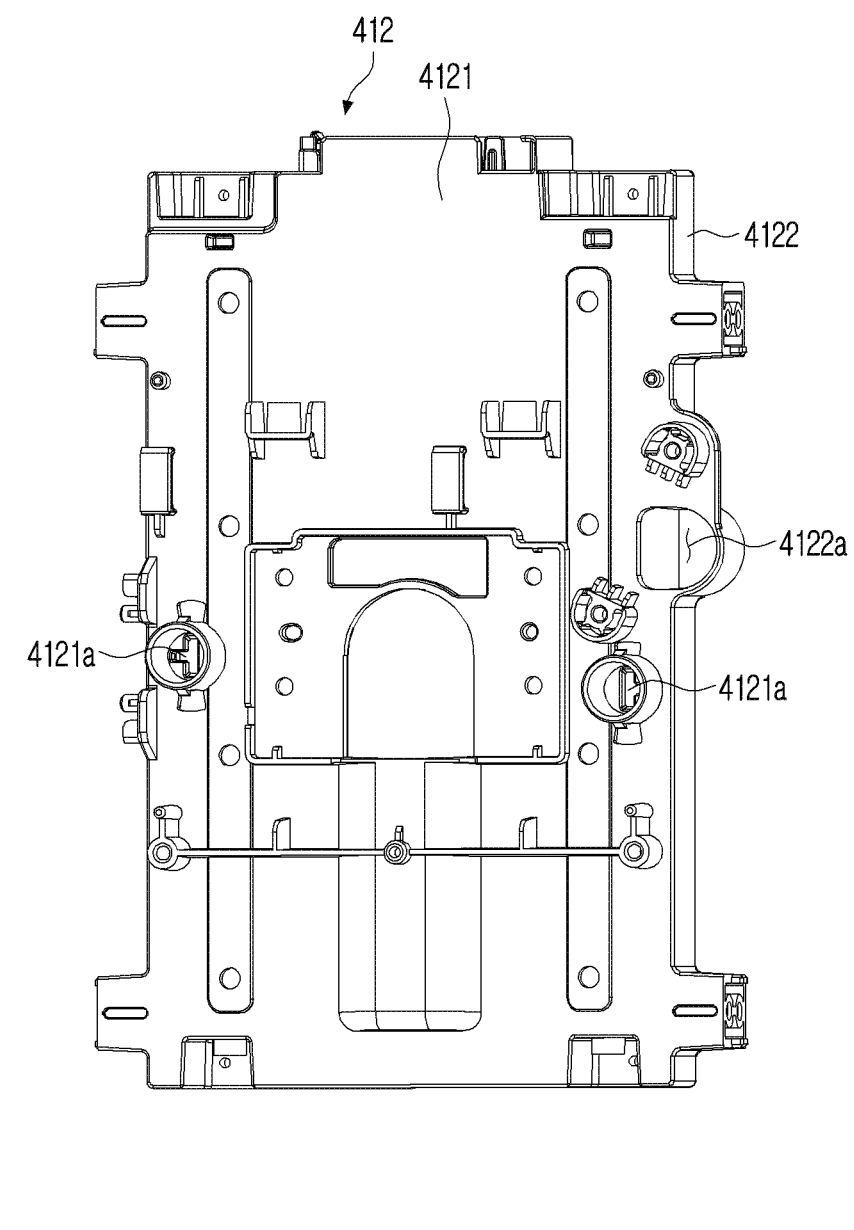
FIG. 11 is a rear view of a base bottom according to an embodiment of the present disclosure.

FIG. 11 is a rear view of a base bottom according to an embodiment of the present disclosure.

Referring to FIGS. 10 and 11 together, a pinion accommodating part 4122a may be formed on one surface of the base bottom wall 4122.

The pinion accommodating part 4121a is configured to accommodate the first gear 441. The pinion accommodating part 4122a may be formed in a half-cylindrical shape having a radius larger than the radius of the first gear 441.

The pinion accommodating part 4122a may be formed by protruding one surface of the base bottom wall 4122 outwardly.

The base bottom plate 4121 may be provided with a pin opening 4121a.

The pin opening 4121a is configured to allow the fixed member 430 to penetrate through the base bottom plate 4121.

The pin opening 4121a may be formed as a hollow having a shape corresponding to a cross section of a pin 431 of the fixed member 430.

Accordingly, even when the fixed member 430 is coupled to a rear surface of the base bottom plate 4121, the fixed member 430 may support the base top 411.

The shape of the pin opening 4121a is not necessarily limited to that illustrated, and its shape may change in response to various embodiments of the fixed member 430.

In the present disclosure, the pin opening 4121a is illustrated on the premise that the cross section of the pin 431 is approximately T-shaped. A detailed description of the cross section of the pin 431 refers to the contents described later in FIG. 20.

Figure 12:
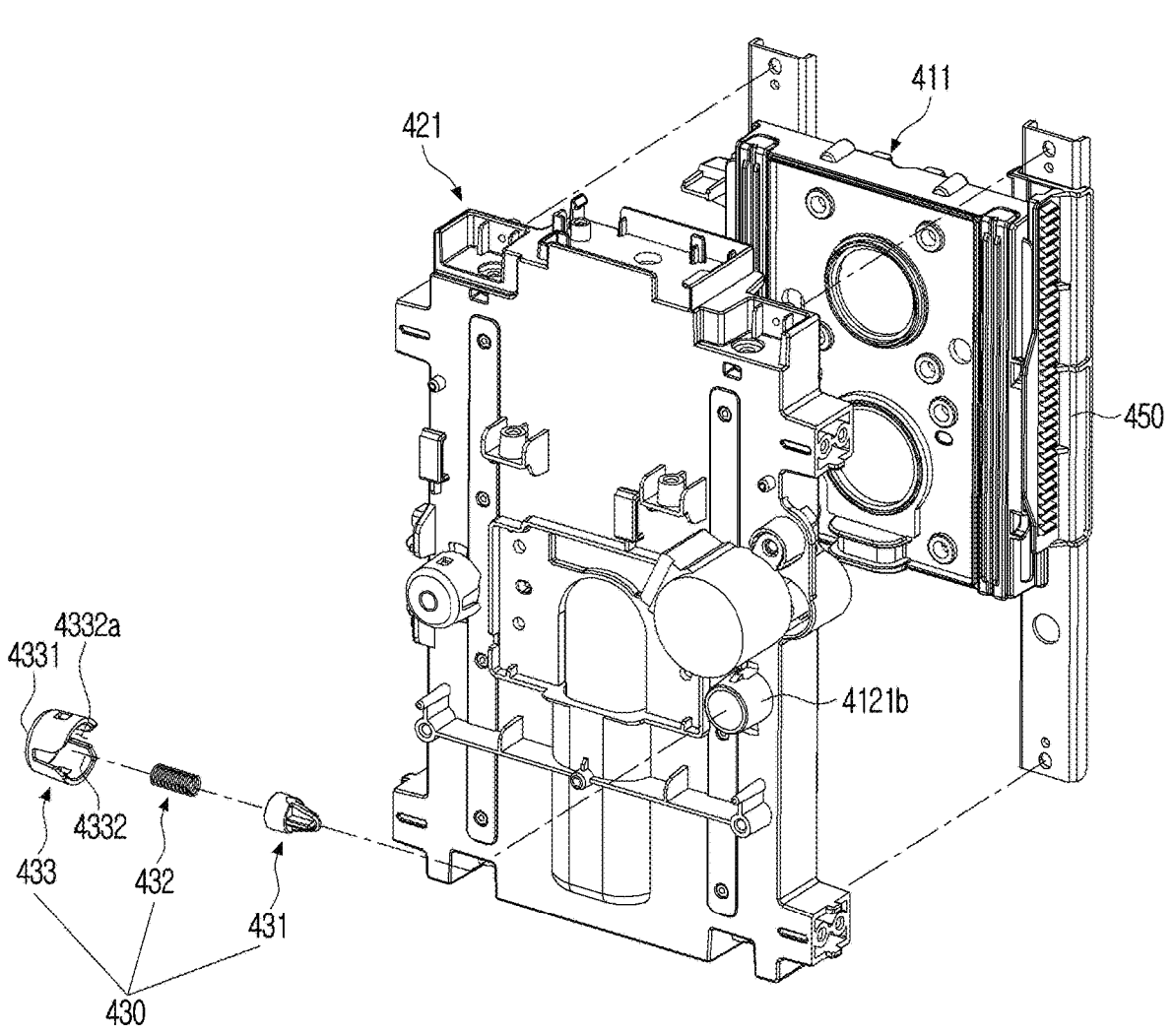
FIG. 12 is an exploded and enlarged view of a fixed member according to an embodiment of the present disclosure.

FIG. 12 is an exploded and enlarged view of a fixed member according to an embodiment of the present disclosure.

Referring to FIG. 12, the fixed member 430 may include the pin 431, an elastic member 432, and a cover 433.

The fixed member 430 may be provided as a single unit. The fixed member 430 may be coupled at a rear surface of the base bottom 412. In other words, the fixed member 430 may be installed biased toward one side of the rear surface of the base bottom 412.

The pin 431 is configured to be in contact with the base top 411 and the guide member 450.

The pin 431 may penetrate through the pin opening 4121a formed in the base bottom 412 as described in FIG. 11.

A portion of the area of the pin 431 may be exposed to a front surface by penetrating through the rear surface of the base bottom 412 through the pin opening 4121a.

A portion of the area of the pin 431 exposed to the front surface may come into contact with the guide member 450.

Since the guide member 450 is configured to be coupled to the base top 411, when the base top 411 moves, the guide member 450 may also move together. Since a portion of the area of the pin 431 comes into contact with the guide member 450, an external force may be applied to the pin 431 while the base top 411 moves.

The elastic member 432 is configured to be coupled to one side of the pin 431 so that the pin 431 moves in one direction when the external force is applied. The elastic member 432 may be a spring, but this is only an example, and the elastic member can be used without limitation as long as it is a component with elastic force.

The cover 433 is configured to be fixed to one end of the elastic member 432 so that the elastic member 432 may be compressed.

The cover 433 may be coupled to the rear surface of the base bottom 412. Since the cover 433 is coupled to the rear surface of the base bottom 412, the fixed member 430 may be stably fixed to a certain position. Accordingly, as described above, even if the external force is applied to the pin 431, the cover 433 does not deviate from the fixed position, so the elastic member 432 whose one side is coupled to the fixed member 433 may be compressed.

In other words, when the pin 431 moves toward the cover 433 by the external force, since the cover 433 is fixed, the elastic member 432 may be compressed by the distance that the pin 431 moves. In this case, the elastic member 432 may have the elastic force in proportion to the compressed length.

The elastic force of the elastic member 432 may be a force directed in an opposite direction to the direction in which the pin 431 moves. Accordingly, the pin 431 may receive the external force directed in the opposite direction of the cover 433.

The cover 433 may be coupled to a cover coupling protrusion 4121b formed on the base bottom 412. The cover coupling protrusion 4121b may be vertically protruded and extended from one surface of the base bottom plate 4121. The cover coupling protrusion 4121b may be in the shape of a hollow cylinder.

The cover 433 may include a cover base 4331 and a cover partition 4332 vertically protruding and extended from an outer circumferential surface of the cover base 4331.

The cover base 4331 may be a circular flat plate, and a groove 4332a may be formed on the cover partition 4332 for coupling to the base bottom 412. However, the shape of the cover 433 is not necessarily limited to that illustrated in the drawing, and may be formed in various shapes in various embodiments.

A diameter of the cover base 4331 may be larger than that of the cover coupling protrusion 4121b. The cover base 4331 may accommodate the cover coupling protrusion 4121b.

The operation of each component of the fixed member 430 according to the movement of the base top 411 will be described in detail below with reference to FIG. 20.

Figure 13:
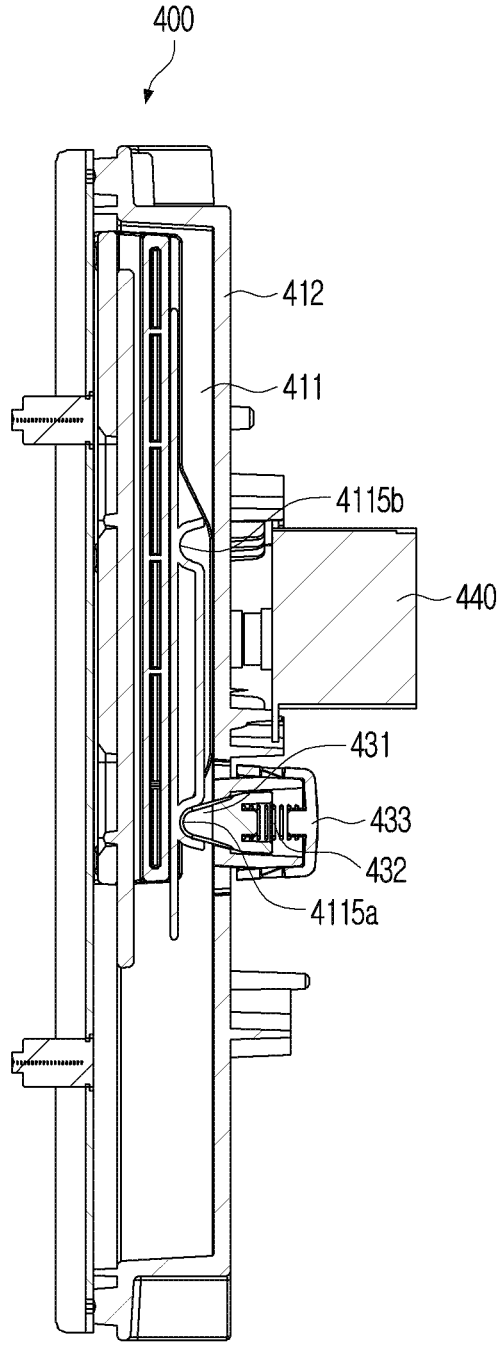
FIGS. 13 and 14 are diagrams illustrating a state in which the fixed member of the movable projector according to an embodiment of the present disclosure is secured to a base top.
Figure 14:
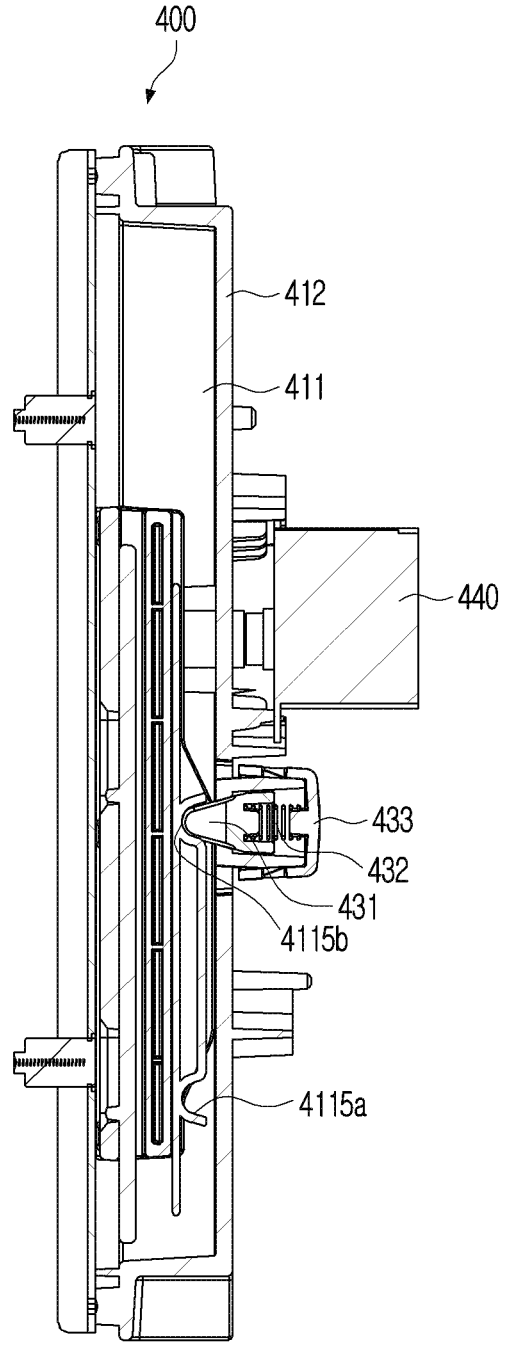

FIGS. 13 and 14 are diagrams illustrating a state in which the fixed member of the movable projector according to an embodiment of the present disclosure is secured to a base top.

Referring to FIGS. 13 and 14, the pin 431 of the fixed member 430 may be secured to the base top 411. Specifically, the pin 431 may be fastened to a fixed groove 4115 of the base top 411.

The fixed groove 4115 may be formed by being depressed to have a shape corresponding to the pin 431. The fixed groove 4115 may be formed on one surface of the base top wall 4113. The fixed groove 4115 may include a first fixed groove 4115a formed on a lower side of the base top 411 and a second fixed groove 4115b formed on an upper side of the first fixed groove 4115a.

FIG. 13 is a diagram illustrating the state in which the pin 431 of the fixed member 430 is fastened to the first fixed groove 4115a, and FIG. 14 is a diagram illustrating the state in which the pin 431 is fastened to the second fixed groove 4115b.

When the pin 431 is fastened to the fixed groove 4115, the elastic force of the elastic member 432 may not be 0. That is, even when the pin 431 is fastened to the fixed groove 4115, the elastic force of the elastic member 432 may act in a direction that pushes the pin 431 toward the fixed groove 4115.

By fastening the pin 431 to the fixed groove 4115, the base top 411 may be stably fixed to a specific position. For example, when the pin 431 is fastened to the first fixed groove 4115a, the base top 411 may be maintained in its position while being fixed to an inner upper portion of the base bottom 412. In contrast, when the pin 431 is fastened to the second fixed groove 4115b, the base top 411 may be maintained in its position while being fixed to the inner lower portion of the base bottom 412.

Figure 15:
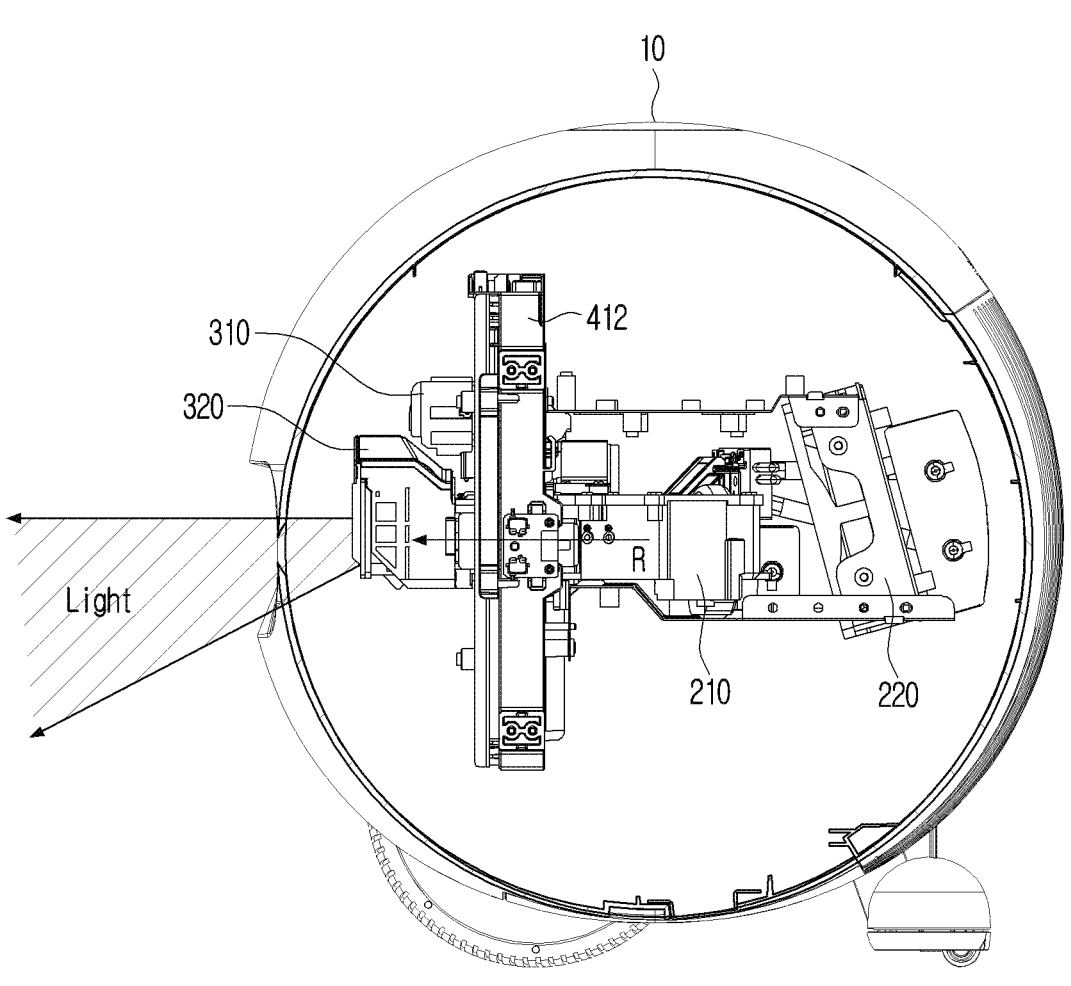
FIGS. 15 and 16 are diagrams schematically illustrating a state in which light is projected from an image output module when the plurality of lens units of the movable projector according to an embodiment of the present disclosure are located at different positions.
Figure 16:
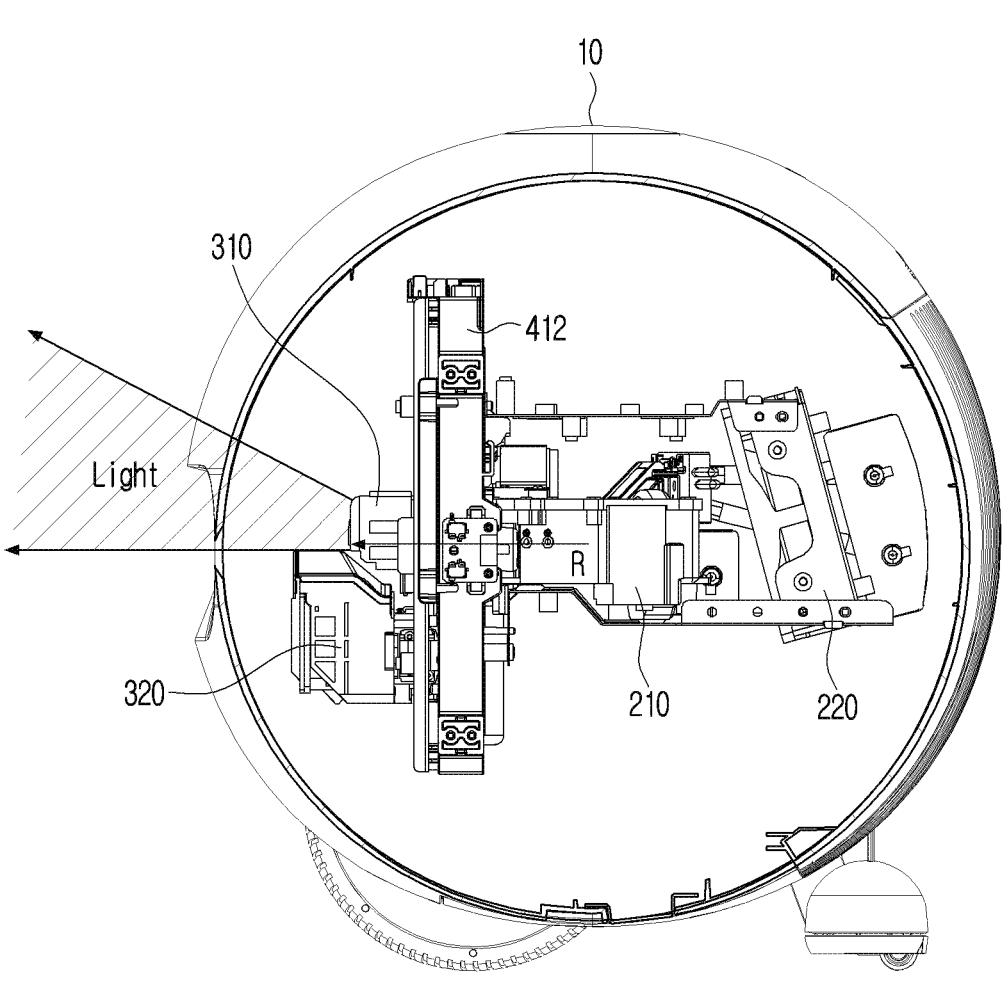

FIGS. 15 and 16 are diagrams schematically illustrating a state in which light is projected from an image output module when the plurality of lens units of the movable projector according to an embodiment of the present disclosure are located at different positions.

FIG. 15 is a diagram illustrating an angle of view of the plurality of lens units 300 while the pin 431 is fastened to the first fixed groove 4115*a* as illustrated in FIG. 13.

When the pin 431 is fastened to the first fixed groove 4115*a*, the base top 411 is fixed to the inner upper portion of the base bottom 412 (see FIG. 13), so the second lens unit 320 is located on a movement path R of light output from the lamp 210.

In this case, the light output from the lamp 210 may be projected toward a front bottom surface of the main body 10 through the second lens unit 320.

FIG. 16 is a diagram illustrating the angle of view of the plurality of lens units 300 while the pin 431 is fastened to second fixed groove 4115*b* as illustrated in FIG. 14.

When the pin 431 is fastened to the second fixed groove 4115*b*, the base top 411 is fixed to the inner lower portion of the base bottom 412 (see FIG. 14), so the first lens unit 310 is located on the movement path of light output from the lamp 210.

In this case, the light output from the lamp 210 may be projected toward a front wall surface of the main body 10 through the first lens unit 310.

Since the base top 411 may be stably fixed at a specific position inside the base bottom 412 by the fixed member 430, the base top 411 may not deviate from the fixed position even when the main body 10 moves.

Accordingly, the image quality, the focus, etc., of the image projected by the projector 1 may be maintained at a preset value.

Here, the preset value means data on the image quality, the focus, etc., of the image calculated for the projector 1 to project light on a specific projection surface at a specific location.

Figure 17:
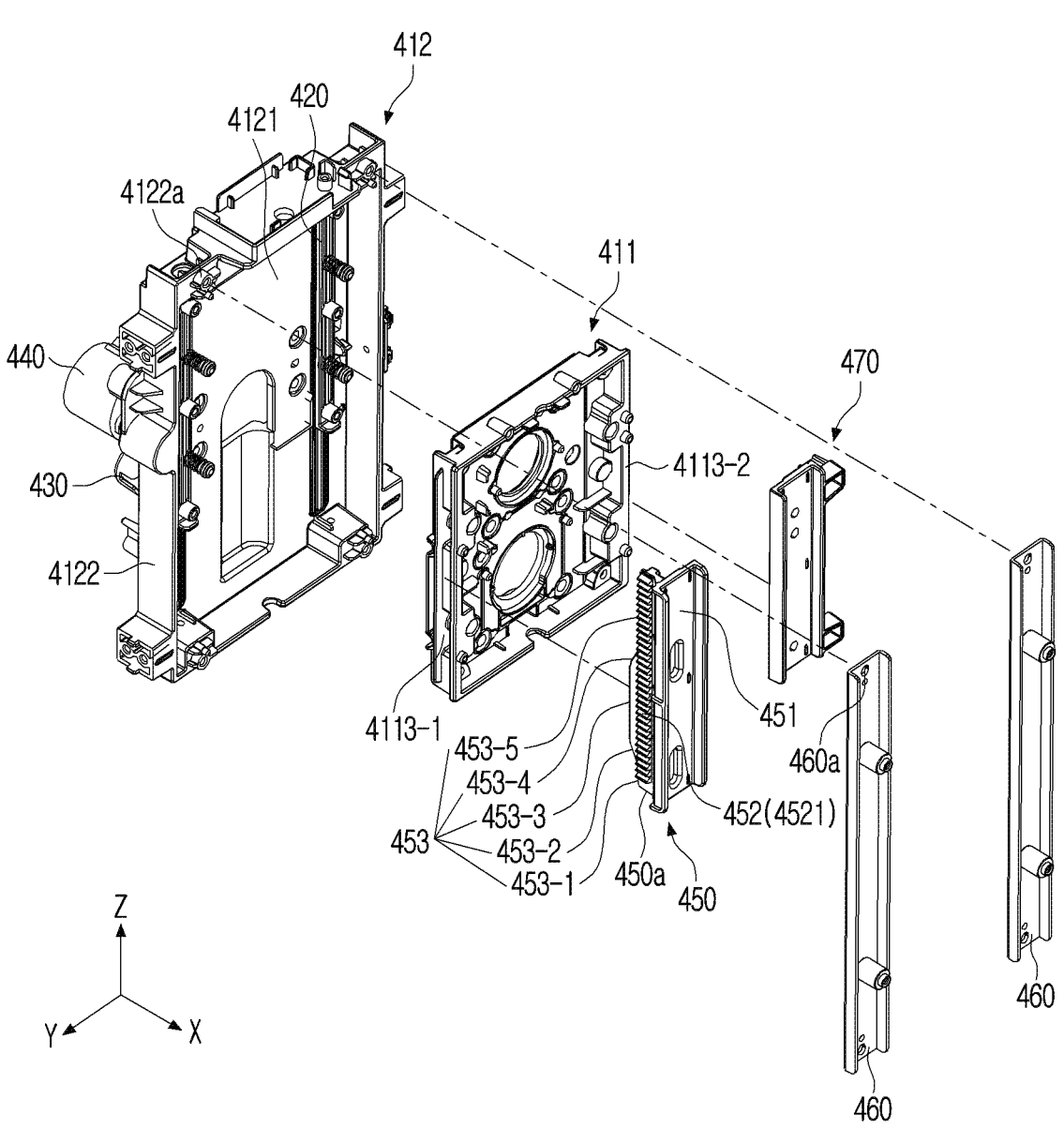
FIG. 17 is a perspective view of a guide member and a guide bracket according to an embodiment of the present disclosure.
Figure 18:
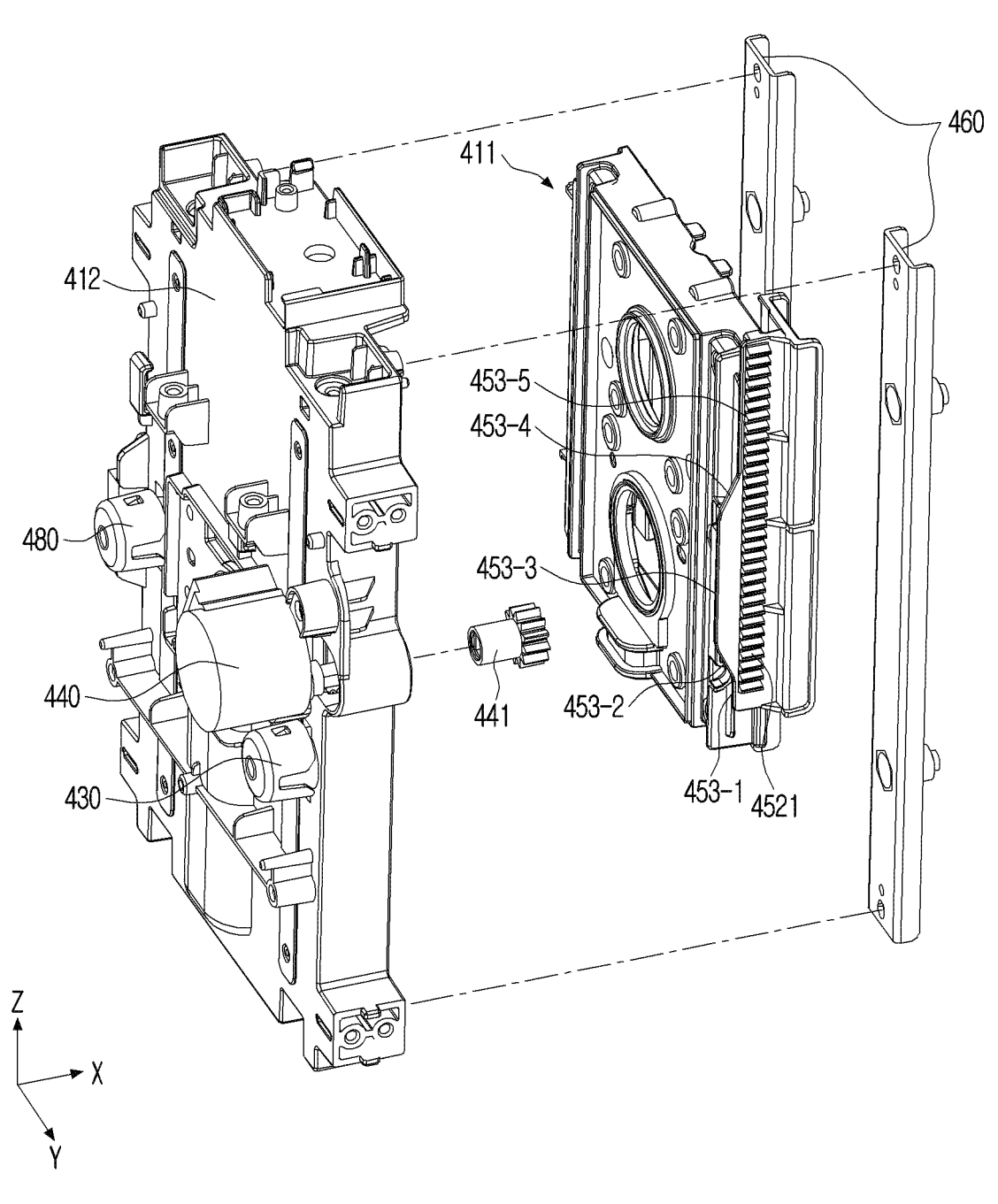
FIG. 18 is a diagram illustrating a state in which the guide member according to an embodiment of the present disclosure is coupled to the base top.

FIG. 17 is a perspective view of a guide member and a guide bracket according to an embodiment of the present disclosure. FIG. 18 is a diagram illustrating a state in which the guide member according to an embodiment of the present disclosure is coupled to the base top.

Referring to FIGS. 17 and 18, the driving unit 400 may further include the guide member 450.

The guide member 450 is configured to be coupled to the base top 411 and to support the fixed member 430. The guide member 450 may be coupled to one side of the base top 411.

The guide member 450 may include a bracket accommodating part 451 and a second gear 452.

The bracket accommodating part 451 is configured to accommodate the guide bracket 460. The bracket accommodating part 451 may be formed in a U shape and accommodate the guide bracket 460 on the inside.

The guide bracket 460 is configured to be provided on one side of the base top 411 and to guide the movement path of the base top 411.

The guide bracket 460 may be provided at a position facing the guide rail 420. The guide bracket 460 may be coupled to the base bottom 412. Specifically, the guide bracket 460 may be coupled to the base bottom wall 4122. To this end, a bracket coupling hole 4122*a* may be formed in one area of the base bottom wall 4122. The bracket coupling hole 4122*a* may be formed in an area of the base bottom wall 4122 that comes into contact with the guide bracket 460.

The guide bracket 460 may have a plurality of holes 460*a* formed in one area that comes into contact with the bracket coupling hole 4122*a*. The plurality of holes 460*a* may be formed to have a shape corresponding to the bracket coupling hole 4122*a*. The guide bracket 460 may be fixed to the base bottom 412 by the coupling member (not illustrated) that penetrates through the plurality of holes 460*a* and is fastened to the bracket coupling hole 4122*a*.

The guide bracket 460 is accommodated in the guide member 450 coupled to the base top 411, so the base top 411 may move up and down along a fixed path.

The second gear 452 is configured to transmit the driving force generated from the motor 440 to the base top 411. The second gear 452 may be arranged to mesh with the first gear 441 to allow the base top 411 to move while the motor 440 is driven.

The second gear 452 may be formed in the longitudinal direction (Z-axis direction) of the guide member 450. The second gear 452 may be formed to protrude vertically in the opposite direction of the bracket accommodating part 451.

The second gear 452 may be a rack gear. The second gear 452 may form a rack-pinion gear structure together with the first gear 441, and a detailed description thereof will be described later with reference to FIG. 23.

Meanwhile, the guide member 450 may further include a guide surface 453.

The guide surface 453 is configured to move the fixed member 430. The guide surface 453 may be formed on one side of the guide member 450. The guide surface 453 may be formed in a direction opposite to the bracket accommodating part 451.

The guide surface 453 may be formed by extending from one side of the second gear 452. The guide surface 453 may be provided in a direction perpendicular to a surface on which teeth 4521 of the second gear 452 are formed.

The guide surface 453 may include first to fifth surfaces 453-1, 453-2, 453-3, 453-4, and 453-5.

The first surface 453-1 may be a surface extending from one side of the guide member 450. The first surface 453-1 may be a surface extending by bending from a lower end 450*a* of the guide member 450. The first surface 453-1 may mean one surface of the second gear 452. That is, the first surface 453-1 may be a surface perpendicular to the surface where the teeth 4521 are formed in the second gear 452, that is, an area of a side surface 4522 of the second gear 452.

The second surface 453-2 may be a surface that protrudes from the first surface 453-1 toward the base bottom plate 4121 and is tapered upward.

An upward angle of the second surface 453-2 is not limited to a specific angle and may be specified at the stage of designing the movement path of the pin 431. Therefore, the upward angle of the second surface 453-2 is not necessarily limited to that illustrated in the drawing.

The third surface 453-3 may be a surface extending parallel to one surface of the base top 411 from the second surface 453-2.

For example, the third surface 453-3 may be formed parallel to the base top plate 4112. The third surface 453-3 may be perpendicular to the surface on which the teeth 4521 of the second gear 452 are formed.

The fourth surface 453-4 may be a surface tapered downward from the third surface 453-3 toward the opposite side of the light source unit 200. A downward angle of the fourth surface 453-4 is not limited to a specific angle.

The fifth surface 453-5 may be a surface extending parallel to one surface of the base top 411 from the fourth surface 453-4. The fifth surface 453-5 may be formed to be parallel to the base top plate 4112. The fifth surface 453-5 may be perpendicular to the surface on which the teeth 4521 of the second gear 452 are formed.

When the base top 411 moves up and down, the elastic member 432 may be compressed or decompressed while the pin 431 of the fixed member 430 moves forward and backward (+Y direction and −Y direction) depending on the shape of the first to fifth surfaces 453-1, 453-2, 453-3, 453-4, and 453-5.

Meanwhile, the driving unit 400 may further include a bracket holder 470. The bracket holder 470 may be coupled to a base top wall 4113-2 at a position facing the base top wall 4113-1 to which the guide member 450 is coupled.

The bracket holder 470 is configured to accommodate the guide bracket 460. The bracket holder 470 may be formed to have a U-shape like the bracket accommodating part 451 of the guide member 450.

Since one side of the base top 411 to which the guide member 450 is not coupled by the bracket holder 470 is supported by the guide bracket 460, the balance of both sides may be maintained when the base top 411 moves.

Figure 19:
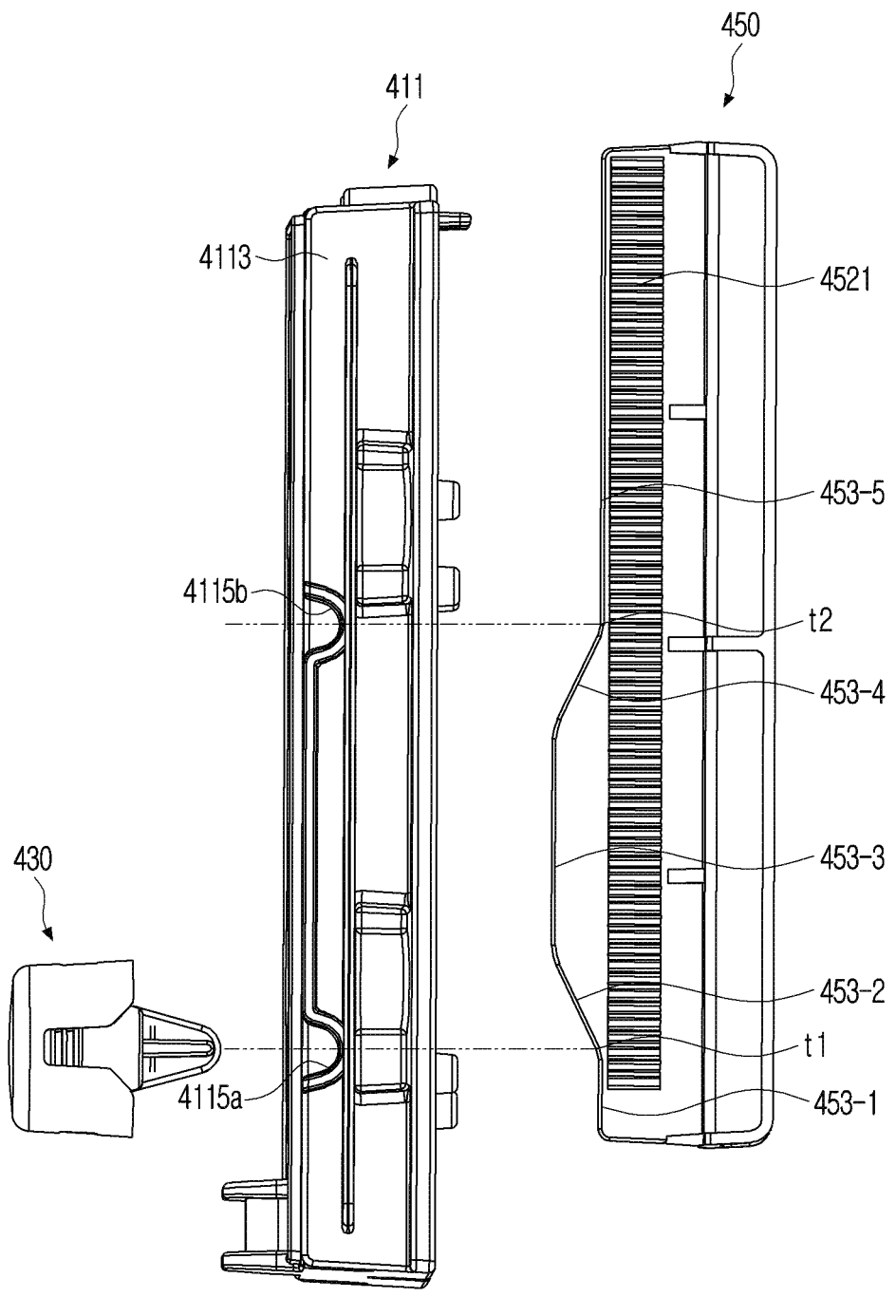
FIG. 19 is a diagram for describing a part of a state in which the base top and the guide member are coupled according to an embodiment of the present disclosure.

FIG. 19 is a diagram for describing a part of a state in which the base top and the guide member are coupled according to an embodiment of the present disclosure.

Referring to FIG. 19, the first fixed groove 4115a may be formed coaxially with a first connection point t1 of the first surface 453-1 and the second surface 453-2. The second fixed groove 4115b may be formed coaxially with a second connection point t2 of the fourth surface 453-4 and the fifth surface 453-5.

That is, a center c1 of the first fixed groove 4115a may be formed on the same imaginary axis line as the first connection point t1 of the first surface 453-1 and the second surface 453-2. A center c2 of the second fixed groove 4115b may be formed on the same imaginary axis line as the second connection point t2 of the fourth surface 453-4 and the fifth surface 453-5.

The second surface 453-2 to the fourth surface 453-4 excluding the connection points t1 and t2 may have a length that protrudes and extends to be spaced apart from the first surface 453-1 and the fifth surface 453-5.

Accordingly, during the movement process of the base top 411, the fixed member 430 may be fastened to the fixed groove 4115 only when it is located at the connection points t1 and t2.

Figure 20:
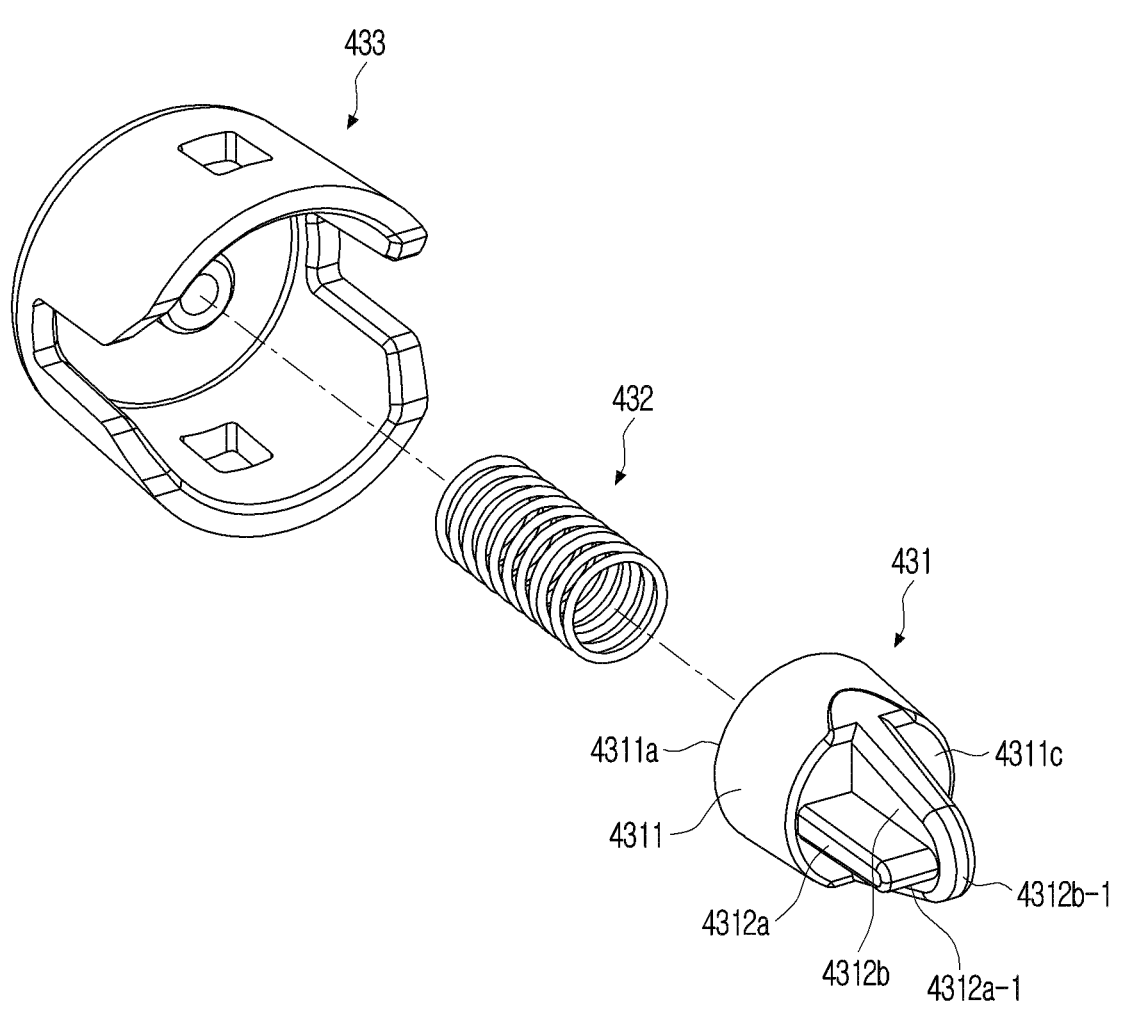
FIG. 20 is a diagram for describing a process in which the fixed member according to an embodiment of the present disclosure is compressed by a guide member.
Figure 21:
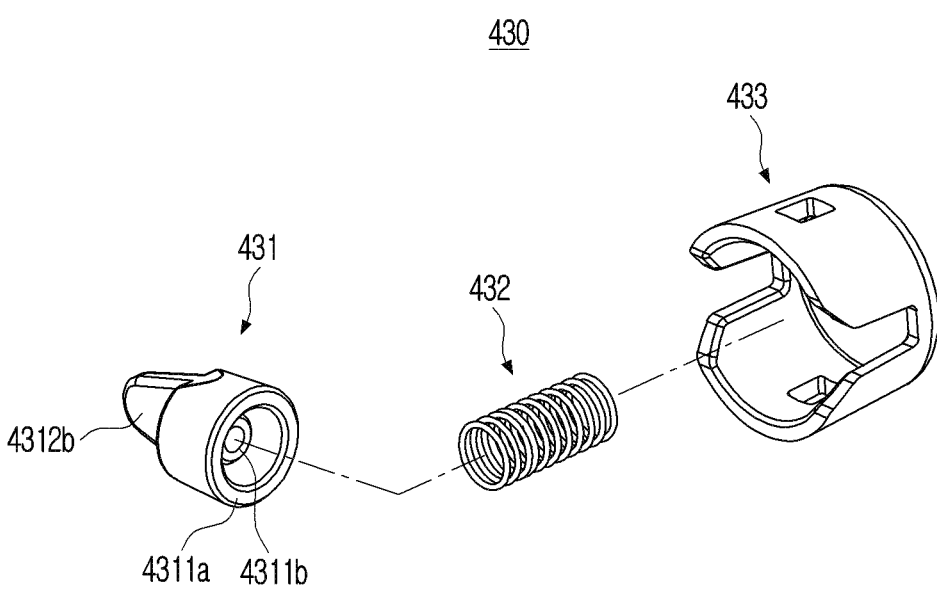
FIGS. 21 to 24 are diagrams for describing a change in a position of the base top by operations of a first gear and a second gear according to an embodiment of the present disclosure.

FIGS. 20 and 21 are perspective and rear views for describing the fixed member according to an embodiment of the present disclosure.

Referring to FIGS. 20 and 21, the pin 431 of the fixed member 430 may be provided to be in contact with the guide surface 453. The elastic member 432 may be coupled to one side of the pin 431 so that the pin 431 moves in the opposite direction of the guide surface 453 when being applied with the external force.

The pin 431 may include a cylindrical body part 4311 and a protrusion 4312 that protrudes and extends outwardly from one side of the body part 4311. The protrusion 4312 may be formed to have an approximately T-shaped cross section.

The protrusion 4312 may include a locking plate 4312a formed to be in contact with the guide surface 453 so as to move along the guide surface 453, and a fixed plate 4312b formed perpendicular to the locking plate 4312a and having a shape corresponding to the fixed groove 4115 so as to be seated in the fixed groove 4115.

The body part 4311 may be formed to have a substantially cylindrical or conical shape. A rear surface 4311a of the body part 4311 may be formed in a hollow cylindrical shape.

A coupling protrusion 4311b may be formed on the inside of the rear surface 4311a of the body part 4311 to which the elastic member 432 is coupled. The body part 4311 may be applied with the elastic force of the elastic member 432 by coupling the coupling protrusion 4311b to the elastic member 432.

The protrusion 4312 may be formed by protruding and extending in the opposite direction of the rear surface 4311a from the front surface 4311c of the body part 4311. A front surface 4311c of the body part 4311 may be a circular plate having a smaller diameter than the rear surface 4311a.

The fixed plate 4312b may be formed to have an outer circumferential surface of an arc shape. A protruding length of the fixed plate 4312b may be formed longer than the diameter of the front surface 4311c of the body part 4311. That is, the fixed plate 4312b may be formed in an arc-shaped shape having a major axis and a minor axis.

An end portion 4312b-1 of the fixed plate 4312b may be seated in the fixed groove 4115. The end portion 4312b-1 of the fixed plate 4312b may have a shape corresponding to the fixed groove 4115.

An outer circumferential surface of the end 4312b-1 of the fixed plate 4312b comes into contact with an inner circumferential surface of the fixed groove 4115, so the protrusion 4312 may be fastened to the fixed groove 4115.

The locking plate 4312a may be formed to be perpendicular to the fixed plate 4312b. The locking plate 4312a may be formed to protrude and extend from the front surface 4311c of the body part 4311.

The locking plate 4312a may have a width of a radius of the front surface 4311c of the body part 4311. An end portion 4312a-1 of the locking plate 4312a may be connected to an end portion 4312b-1 of the fixed plate 4312b.

A length of the locking plate 4312a protruding from the front surface 4311c of the body part 4311 may be the same as the protruding length of the fixed plate 4312b.

The locking plate 4312a may be formed to have the outer circumferential surface of the arc shape having a major axis and a minor axis. The locking plate 4312a may have the same shape as one area of the fixed plate 4312b. The locking plate 4312a may have a shape that shares the same major axis as the fixed plate 4312b.

Since the locking plate 4312a shares the same major axis as the fixed plate 4312b, and the locking plate 4312a and the fixed plate 4312b are formed to be perpendicular to each other, so the cross section of the protrusion 4312 may be formed approximately in a T shape.

Figure 22:
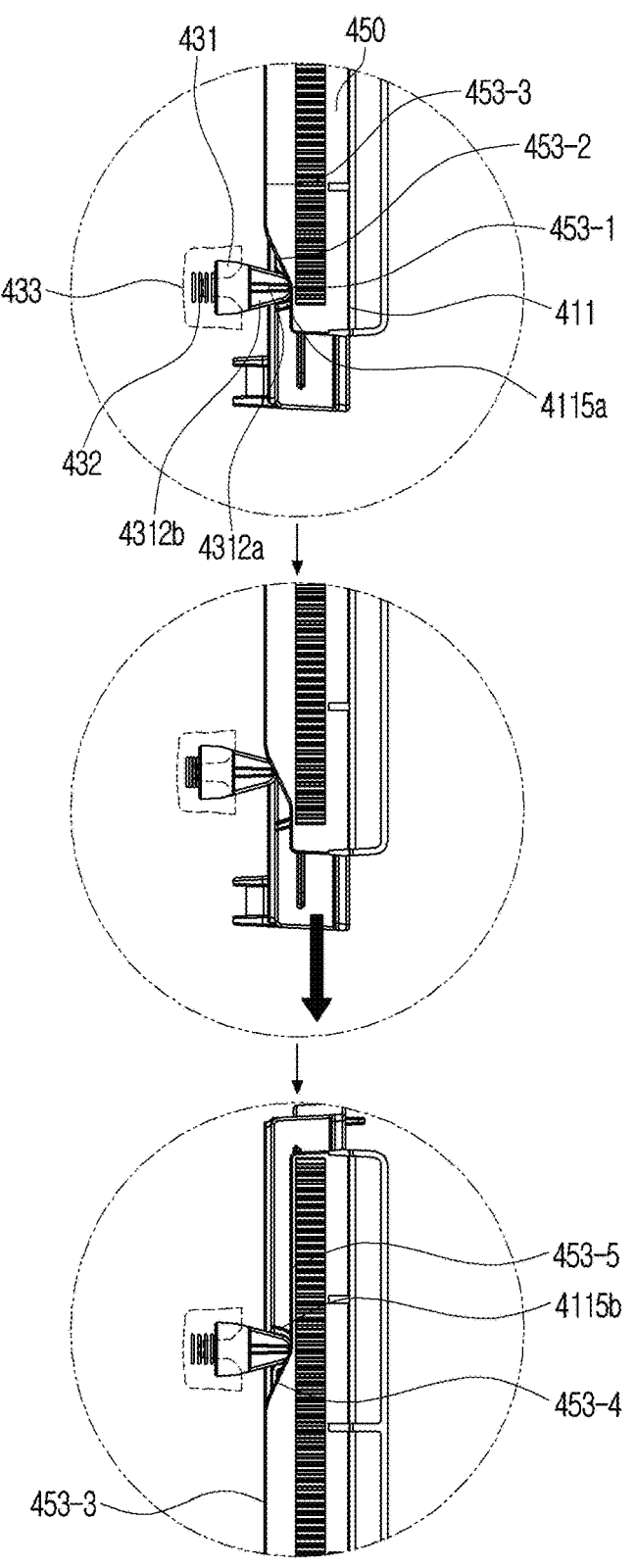

FIG. 22 is a diagram for describing a process in which the fixed member according to an embodiment of the present disclosure is compressed by the guide member.

Referring to FIG. 22, as the base top 411 moves downward from the inside of the base bottom 412, the guide member 450 coupled to the base top 411 may also move downward. When the base top 411 and the guide member 450 move downward, the fixed member 430 that was fastened to the first fixed groove 4115a may be released.

Specifically, when the fixed member 430 is fastened to the first fixed groove 4115a, the fixed plate 4312b may be accommodated in the inner side of the first fixed groove 4115a, and the locking plate 4312a may be supported at the first connection point t1 of the first surface 453-1 and the second surface 453-2.

In this case, the elastic member 432 may be pressing the pin 431 toward the guide surface 453.

When the base top 411 moves downward by the driving force generated from the motor 440, the fixed plate 4312b may be detached from the first fixed groove 4115a. Specifically, as the guide member 450 moves downward, the locking plate 4312a may be pushed by the inclined second surface 453-2. That is, the pin 431 is applied with a force acting in the opposite direction of the base top 411 and the elastic member 432 is compressed by this force, so the pin 431 may move away from the base top 411.

Thereafter, as the base top 411 moves downward, the locking plate 4312a may be supported by the second connection point t2 along the third surface 453-3 and the fourth surface 453-4. In this process, the fixed plate 4312b may be seated and fastened to the second fixed groove 4115b. In other words, since the base top 411 moves downward and the compressed elastic member 432 presses the pin 431 with the elastic force having the direction opposite to the direction in which it is compressed, the fixed plate 4312b may be stably fastened to the second fixed groove 4115b.

Figure 23:
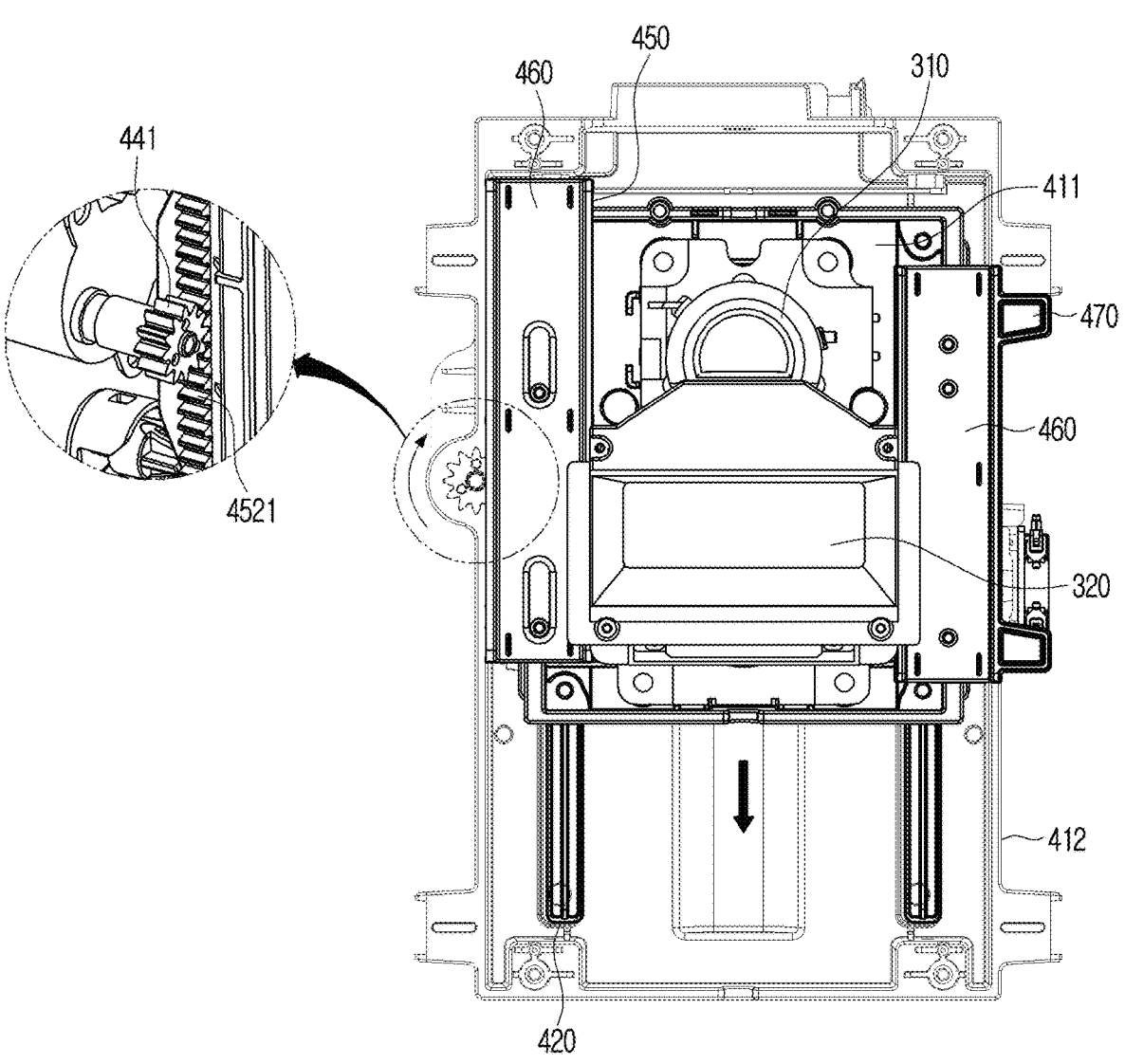
Figure 24:
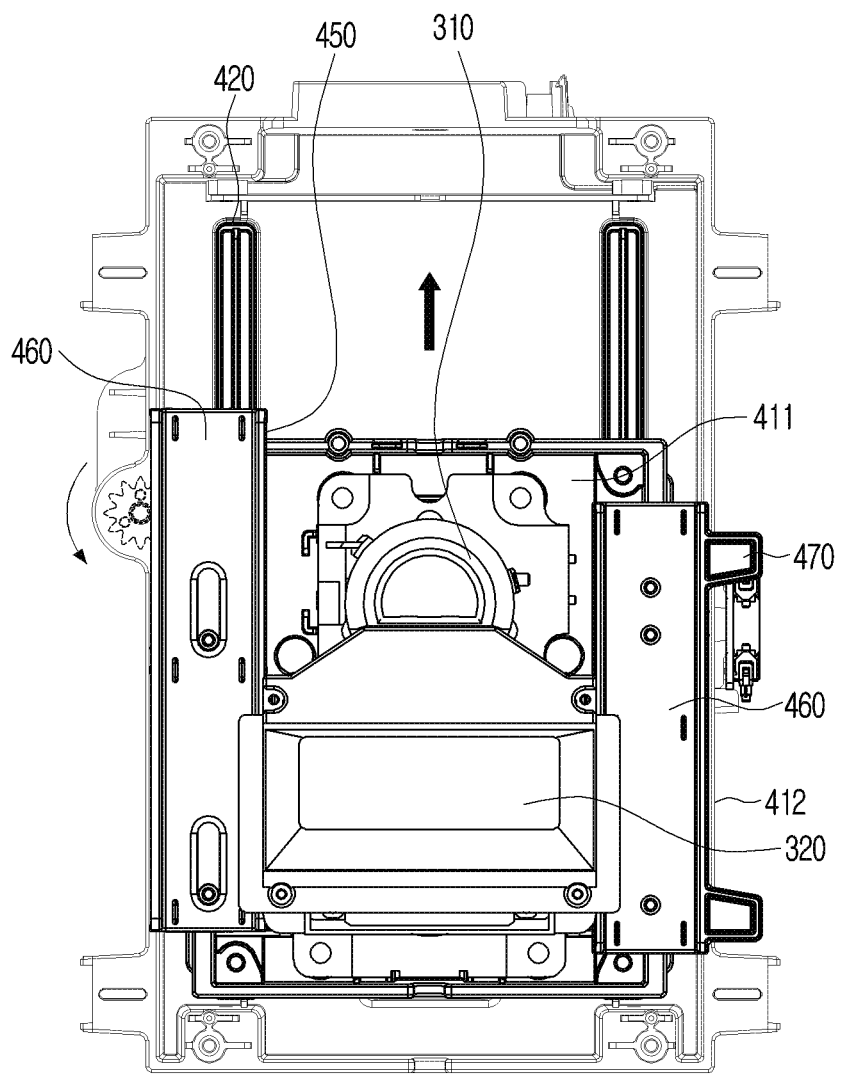

FIGS. 23 and 24 are diagrams for describing a change in a position of the base top by operations of a first gear and a second gear according to an embodiment of the present disclosure.

Referring to FIG. 23, the first gear 441 and the second gear 452 may be arranged to mesh with each other to form a rack-and-pinion gear structure.

As the motor 440 is driven, the first gear 441 may rotate clockwise. As the first gear 441 rotates clockwise, the base top 411 may move downward of the base bottom 412.

In this case, the first lens unit 310 among the plurality of lens units 300 is located on the movement path of light output from the light source unit 200.

That is, the projector 1 projects light on the projection surface that is arranged horizontally, such as the floor surface in front of the main body 10, and then rotates the first gear 441 clockwise to project light on the projection surface (e.g., a wall surface, a furniture surface, etc.) that is arranged vertically in front of the main body 10.

Accordingly, the lens unit that projects light may change from the second lens unit 320 to the first lens unit 310.

Referring to FIG. 24, when the first gear 441 rotates counterclockwise as the motor 440 is driven, the base top 411 may move to the upper side of the base bottom 412.

In this case, the second lens unit 320 among the plurality of lens units 300 is located on the movement path of light output from the light source unit 200.

That is, the projector 1 projects light onto the projection surface (e.g., a wall surface, a furniture surface, etc.) provided vertically in front of the main body 10, and then rotates the first gear 441 counterclockwise to project the light onto the projection surface provided horizontally, such as a floor surface, in front of the main body 10.

Accordingly, the lens unit that projects light may change from the first lens unit 310 to the second lens unit 320.

The description of the projection angle, i.e., the angle of view, when the first lens unit 310 and the second lens unit 320 project light will be omitted to the extent that it overlaps with the above description.

Meanwhile, before and after the base top 411 moves as described above, the base top 411 may be stably maintained in the changed position by the fixed member 430.

Figure 25:
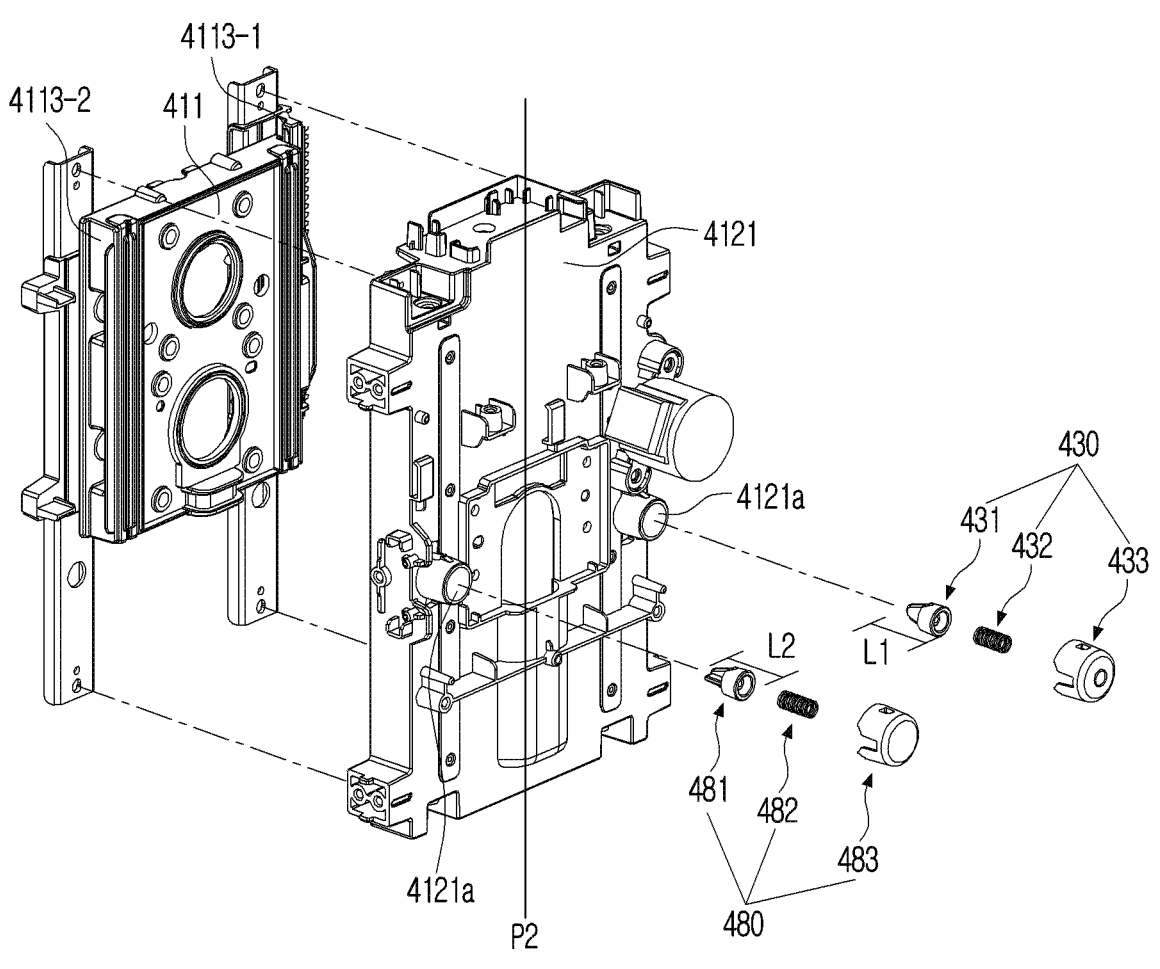
FIG. 25 is a diagram for describing a balance member according to an embodiment of the present disclosure.

FIG. 25 is a diagram for describing a balance member according to an embodiment of the present disclosure.

Referring to FIG. 25, the driving unit 400 may further include a balance member 480. The balance member 480 may have the same shape as the fixed member 430.

The balance member 480 may be provided as a pair with the fixed member 430. The balance member 480 may include a pin 481, an elastic member 482, and a cover 483.

However, the balance member 480 does not necessarily have to be formed to have the same shape as the fixed member 430. For example, the pin 481 of the balance member 480 may have a different shape from the pin 431 of the fixed member 430. In this case, an overall length L2 of the pin 481 of the balance member 480 may be the same as an overall length L1 of the pin 431 of the fixed member 430.

The balance member 480 may be provided in an area opposite to the area of the base bottom plate 4121 where the fixed member 430 is provided. In other words, the fixed member 430 and the balance member 480 may be installed symmetrically on both sides based on an imaginary axis P2 passing through the center of the base bottom plate 4121 in the Z-axis direction.

The corresponding pin opening 4121a may also be formed as a pair in the base bottom plate 4121.

The pin 481 of the balance member 480 may be supported by the base top wall 4113. The elastic member 482 may be assembled to the balance member 480 in the compressed state. The pin 481 may maintain a state of pressing the base top wall 4113 by the elastic force of the elastic member 482.

Meanwhile, the base top wall 4113 supporting the balance member 480 may be configured to face the base top wall 4113 in which the fixed groove 4115 is formed. For example, the fixed groove 4115 may be formed in the left base top wall 4113-1, and the right base top wall 4113-2 may support the balance member 480.

In this way, the base top 411 is supported on both the left and right sides by the fixed member 430 and the balance member 480, so the base top 411 may move while maintaining the left and right balance.

Figure 26:
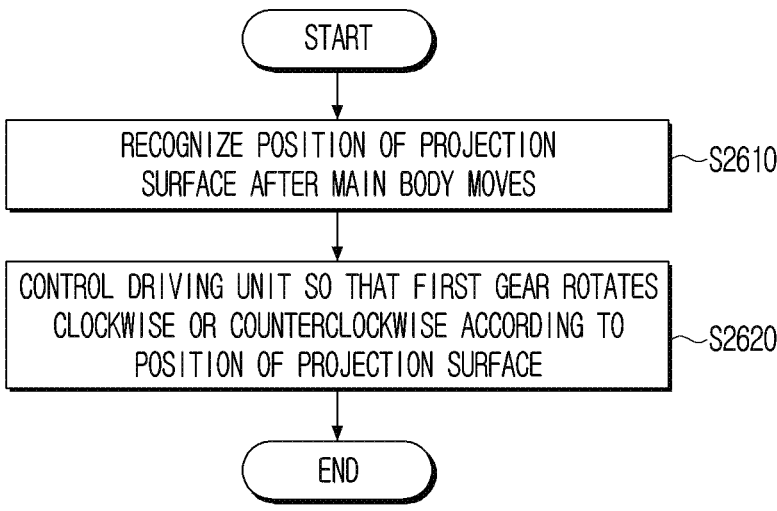
FIG. 26 is a flowchart for describing an operation of a projector according to an embodiment of the present disclosure.

FIG. 26 is a flowchart for describing an operation of a projector according to an embodiment of the present disclosure.

Referring to FIG. 26, when the projection surface changes as the main body moves by the plurality of wheels, the projector may recognize the position of the projection surface by determining whether the projection surface is positioned vertically in front of the main body or horizontally in front of the main body based on data about the distance, the angle, etc., between the main body and the projection surface sensed by the sensor (S2610).

When the recognized projection surface is a wall surface, and the projection surface on which light was projected before the position of the main body was changed was a floor surface, the driving unit may be controlled so that the first gear rotates counterclockwise (S2620).

In contrast, when the recognized projection surface is a floor surface, and the projection surface on which light was projected before the position of the main body was changed was a wall surface, the driving unit may be controlled so that the first gear rotates clockwise (S2620).

The method described in FIG. 26 may be performed by the projector 1 described in various embodiments described above, but is not necessarily limited thereto, and may be performed by the projector having a different structure in which some components are omitted or changed. In addition, even when implemented in the form of the projector without the wheel, the projection surface may vary depending on the position where it is placed. Even in this case, various embodiments described above may be applied.

In other words, the projector according to an embodiment of the present disclosure may have the plurality of lens units, and may control the driving unit to adjust the position of the lens unit having the projection direction corresponding to the type of the recognized projection surface to the transmission position on the progression path of light.

In addition, the fixed member and the fixed groove to which the fixed member is fastened may be provided so that the changed positions of the plurality of lens units are stably maintained.

Accordingly, even if the main body moves while the projector is moving, the plurality of lens units may be stably fixed at a certain position, and the convenience and stability of use may be increased by controlling light to be transmitted through an appropriate lens unit among different lens units depending on the type of the projection surface.

Although the diverse embodiments of the disclosure have been individually described hereinabove, the respective embodiments are not necessarily implemented singly, and may also be implemented so that configurations and operations thereof are combined with those of one or more other embodiments.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

What is claimed is:

1. A movable projector, comprising:
a main body;
at least one wheel that moves the main body;
a light source unit that moves with the main body, and that emits light;
a plurality of lens units that have different directions for projecting the light;
a driving unit that adjusts positions of the plurality of lens units; and
a processor configured to, when the main body is moved by the at least one wheel so that the projection surface changes, control the driving unit to adjust a position of a lens unit of the plurality of lens units having a projection direction corresponding to the changed projection surface to a transmission position on a progression path of the light.

2. The movable projector of claim 1, wherein the plurality of lens units include:
a first lens unit that projects light upward relative to the light source unit, and
a second lens unit that projects light downward relative to the light source unit.

3. The movable projector of claim 2, wherein the processor is further configured to:
control the driving unit to adjust a position of the first lens unit to the transmission position when the changed projection surface is a wall surface, and
control the driving unit to adjust a position of the second lens unit to the transmission position when the changed projection surface is a floor surface.

4. The movable projector of claim 1, wherein the driving unit includes:
a base that supports the light source unit and the plurality of lens units,
a fixed member that is on the base and that fixes one of the plurality of lens units in the transmission position, and
a motor that is on a side of the base.

5. The movable projector of claim 4, wherein the base includes:
a base top to which the plurality of lens units are coupled, and that is movable up and down, and
a base bottom to which the light source unit is coupled.

6. The movable projector of claim 5, wherein the base top further includes:
a plurality of seating parts respectively corresponding to the plurality of lens units and to which the plurality of lens units are respectively coupled, and
each seating part of the plurality of seating parts includes a hole through the base top in a thickness direction.

7. The movable projector of claim 5, wherein the driving unit further includes a guide member that is coupled to the base top to support the fixed member.

8. The movable projector of claim 7, further comprising:
a first gear that is coupled to the motor to transmit a driving force of the motor to the base top.

9. The movable projector of claim 8, wherein the guide member is coupled to a side of the base top.

10. The movable projector of claim 9, wherein the guide member includes:
a guide surface that moves the fixed member, and
a second gear that is meshed with the first gear so that, with the driving force transmitted to the first gear, the second gear is moved by movement of the first gear and movement of the second gear thereby moves the base top.

11. The movable projector of claim 10, wherein the guide surface includes:
a first surface that extends from a side of the guide member,
a second surface that protrudes from the first surface toward the light source unit and tapers upward,
a third surface that extends from the second surface parallel to a surface of the base top,
a fourth surface that tapers downward from the third surface away from the light source unit, and
a fifth surface that extends from the fourth surface parallel to the surface of the base top.

12. The movable projector of claim 11, wherein the fixed member includes:
a pin that is in contact with the guide surface,
an elastic member that is coupled to a side of the pin so that, with an external force applied to the pin, the pin moves in a direction away from the guide surface,
a cover that is coupled to an end of the elastic member, and
the base top includes a fixed groove having a shape corresponding to the pin.

13. The movable projector of claim 12, wherein the fixed groove includes:
a first fixed groove that is on a lower side of the base top, and
a second fixed groove that is above the first fixed groove.

14. The movable projector of claim 13, wherein the first fixed groove is coaxial with a connection point between the first surface and the second surface, and
the second fixed groove is coaxial with a connection point between the fourth surface and the fifth surface.

15. The movable projector of claim 14, wherein the pin includes:
a cylindrical body part,
a protrusion that extends outward from a surface of the cylindrical body part, has a T-shaped cross-section, and includes a locking plate that contacts, and is moveable along, the guide surface, and a fixed plate orthogonal to the locking plate, and that
has a shape corresponding to, and seatable in, the
fixed groove.

* * * * *